United States Patent
Nozawa et al.

[11] Patent Number: 6,149,564
[45] Date of Patent: Nov. 21, 2000

[54] TONER SUPPLY ROLL INCLUDING POROUS CYLINDRICAL POLYURETHANE SPONGE STRUCTURE HAVING SKIN LAYER HAVING OPENINGS AND ALTERNATE PROTRUSIONS AND RECESSES, AND METHOD OF PRODUCING THE SAME

[75] Inventors: Akitoshi Nozawa, Komaki; Keita Shiraki, Inuyama, both of Japan

[73] Assignee: Tokai Rubber Industries, Ltd., Japan

[21] Appl. No.: 09/116,741

[22] Filed: Jul. 15, 1998

[30] Foreign Application Priority Data

| Jul. 17, 1997 | [JP] | Japan | 9-192595 |
| Feb. 20, 1998 | [JP] | Japan | 10-038323 |

[51] Int. Cl.⁷ ........................................ A01B 29/04
[52] U.S. Cl. ............................... 492/30; 492/56; 492/37; 399/281; 264/46.7; 264/46.9
[58] Field of Search .................. 492/18, 30, 37, 492/56; 399/281, 272; 264/46.5, 46.6, 46.7, 46.9; 29/895.32

[56] References Cited

U.S. PATENT DOCUMENTS

| 4,399,933 | 8/1983 | Anderson et al. | 222/407 |
| 4,696,255 | 9/1987 | Yano et al. | 399/281 |
| 4,788,570 | 11/1988 | Ogata et al. | 399/283 |
| 5,311,264 | 5/1994 | Kinoshita | 399/281 |
| 5,655,197 | 8/1997 | Okada et al. | 399/281 |

FOREIGN PATENT DOCUMENTS

| 0 789 285 | 8/1987 | European Pat. Off. |
| 0 397 501 | 11/1990 | European Pat. Off. |
| 2-287576 | 11/1990 | Japan |
| 3-155575 | 7/1991 | Japan |
| 4-55873 | 2/1992 | Japan |
| 5-35110 | 2/1993 | Japan |
| 5-61350 | 3/1993 | Japan |
| 6-301281 | 10/1994 | Japan |
| 7-36273 | 2/1995 | Japan |

OTHER PUBLICATIONS

Patent Abstracts of Japan, vol. 1996, No. 04, Apr. 30, 1996 & JP 07 315617 A (Mitsubishi Cable Ind. Ltd.), Dec. 5 1995. *abstract*.

Patent Abstracts of Japan, vol. 017, No. 611 (P–1641), Nov. 10, 1993 & JP 05 188774 A (Bando Chem Ind. Ltd.), Jul. 30, 1993 *abstract*.

Patent Abstracts of Japan, vol. 012, No. 305 (M–733), Aug. 19, 1988 & JP 63 082710 A (Showa Electric Wire & Cable Co. Ltd.), Apr. 13, 1988 *abstract*.

*Primary Examiner*—David P. Bryant
*Assistant Examiner*—Marc W. Butler
*Attorney, Agent, or Firm*—Burr & Brown

[57] ABSTRACT

A toner supply roll including a cylindrical soft polyurethane sponge structure formed on an outer circumferential surface of a metal shaft by foam molding of a polyurethane material in a mold cavity of a mold. The sponge structure having hardness of 350 g or lower includes a skin layer having a network of cells and openings open in its outer circumferential surface and communicating with respective ones of the cells located adjacent to the skin layer, such that the openings are substantially aligned with central portions of the respective ones of the cells in axial and circumferential directions of the sponge structure. Each opening has a size of 100–800 μm, and a total area of the openings is at least 20% of the total surface area of the skin layer. The sponge structure has a plurality of protrusions formed on the outer circumferential surface of the skin layer so as to extend linearly or helically in the axial direction of the sponge structure. The protrusions have a height of 20–3000 μm and are arranged in a circumferential direction of the sponge structure with a pitch of 300–3000 μm, so that the skin layer is provided with recesses each interposed between the adjacent protrusions. Methods of producing the roll are also disclosed.

15 Claims, 10 Drawing Sheets

TONER SUPPLY ROLL INCLUDING POROUS CYLINDRICAL POLYURETHANE SPONGE STRUCTURE HAVING SKIN LAYER HAVING OPENINGS AND ALTERNATE PROTRUSIONS AND RECESSES, AND METHOD OF PRODUCING THE SAME

CROSS REFERENCE TO RELATED APPLICATIONS

U.S. patent application Ser. No. 08/790,858 filed Feb. 3, 1997 now U.S. Pat. No. 5,768,668.

This application is based on Japanese Patent Applications No. 9-192595 filed Jul. 17, 1997 and No. 10-038323 filed Feb. 20, 1998, the contents of which are incorporated hereinto by reference.

BACKGROUND OF THE INVENTION

1. Field of the Invention

The present invention relates in general to a toner supply roll for transferring a toner, and a method of producing such a toner supply roll, and more particularly to a toner supply roll incorporated in an image developing device used in an image forming apparatus such as copying apparatus, image recording apparatus, printer and facsimile, and a method suitable for producing such a toner supply roll. The image developing device is adapted to develop an electrostatic latent image into a visible image consisting of a toner or developer. The visible image is formed on a suitable image bearing medium such as a photoconductive or photosensitive medium used in electrophotography, or a dielectric medium used in electrostatic recording. The toner supply roll functions to transfer the toner to such an image bearing medium for developing the latent image into the visible image.

2. Discussion of the Related Art

In such a known copying, recording, printing, facsimile reception or other image forming apparatus, an electrostatic image formed on a photoconductive or electrostatic dielectric image-bearing medium is developed by an image developing device into a visible image by transfer of a toner to selected local spots on the imagewise exposed image-bearing medium. The image developing device has a hopper accommodating a mass of the toner (developer), and incorporates an image developing roll, and a toner supply roll which is a soft elastic roll adapted to supply the toner to the image developing roll so as to transfer the toner to the image-bearing medium.

For instance, the toner supply roll used in such an image developing device is an elastic roll of a polyurethane foam or sponge structure, as disclosed in JP-A-3-155575. Several methods have been proposed to produce or manufacture such an elastic roll. These methods include: method A including the steps of obtaining a roll by cutting a slab of a foam product generated by foaming a material in a mold, inserting a metal shaft through the roll, and grinding or polishing the circumferential surface of the roll to finish the roll into the desired shape; method B including the steps of foaming a material in a mold so as to form a cylindrical sponge structure on a metal shaft, and grinding the sponge structure to remove an unnecessary portion for thereby obtaining the toner supply roll of the desired shape; and method C wherein a sponge structure is formed on a metal shaft in the same manner as in the method B, but the grinding step is not implemented.

However, the conventional methods A, B and C of producing the elastic roll suffer from various potential problems. For example, the methods A and B include the complicated process steps, and suffer from fluffing of the surface of the roll due to the grinding step, namely, generation of undesirable burrs or fuzz left on the ground or polished surface of the roll, and unsatisfactory dimensional accuracy of the roll. Although the method C is free from such problems, this method does not permit the skin layer of the roll to have a sufficiently large thickness. The insufficient thickness of the skin layer may cause easy breakage of the skin layer due to friction resistance during use of the roll as the toner supply roll, in which the roll is held in rolling contact with an image developing roll. Thus, the method C does not assure sufficient durability of the roll.

The durability of the elastic roll produced according to the method C may be increased by: 1) increasing the density of the sponge structure and increasing the thickness of the skin layer, so as to increase the strength of the skin layer, 2) improving the physical properties (tensile strength, elongation and hardness) of the roll, or 3) employing a so-called "integral skin foam" which facilitates the formation of the skin layer. These measures, however, all result in increasing the hardness of the foam or sponge structure of the roll. Generally, the toner supply roll is required to have a high degree of flexibility as well as a high level of durability. The method C does not permit these two requirements to be satisfied simultaneously.

The elastic toner supply roll of the image developing device is required to have functions of supplying a suitably controlled amount of the toner to the image developing roll and of scratching off an unnecessary amount of the toner from the image developing roll, so that the toner is uniformly distributed on the image developing roll. The surface of the toner supply roll produced according to the known methods A and B tends to be fluffed or given burrs or fuzz, leading to instability of the amount of the toner to be transferred to the image developing roll, and resulting in deteriorated quality of an image reproduced by the toner. Further, the burrs removed from the toner supply roll may act as foreign matters which may be unfavorably left in the other portions of the image forming apparatus, resulting in the deteriorated quality of the reproduced image and malfunction of the apparatus.

The elastic toner supply roll produced according to the known method C suffers from the problem of foreign matters as indicated above with respect to the methods A and B, namely, removal of fragments of the material of the sponge structure due to breakage of the skin layer of the sponge structure as described above. Further, the toner is likely to enter the interior of the sponge structure through the broken portions of the skin layer, resulting in hardening of the broken portions, that is, local hardening of the sponge structure of the roll, which may cause instability of the amount of the toner to be transferred from the roll.

The conventionally used toner which is transferred by the toner supply roll tends to have a relatively small particle size and a relatively low melting point so as to meet the demands for an improved image quality reproduced by the toner and an increased speed of printing. Such a toner is likely to be aggregated due to electrostatic charging and long-term storage thereof. Accordingly, the aggregated masses of the toner powder are likely to remain on the outer circumferential surface of the image developing roll, so that the remaining toner cannot be sufficiently scratched off by the toner supply roll from the surface of the image developing roll, leading to occurrence of an unfavorable variation of the toner concentration or density of the reproduced image. The toner supply roll is held in rolling contact with the image developing roll, and is rotated with the image developing device in the same direction. At the nip between two rolls, the toner supply roll removes the residual toner stuck to the surface of the image developing roll, while evenly transferring a new layer of the toner to the surface of the image developing roll. However, the conventional elastic toner supply roll does not have a sufficient function to scratch off the residual toner which is aggregated or stuck on the outer circumferential surface of the image developing roll, resulting in partial remaining of the toner on the outer circumferential surface of the image developing roll. This may cause uneven distribution of the toner on the image developing roll, resulting in a variation of the toner concentration of the reproduced image.

For improving the function of the toner supply roll to scratch off the residual toner stuck on the image developing roll, it may be considered to increase the hardness of the toner supply roll or to increase the contact pressure at the nip between the toner supply roll and the image developing device. Both of the proposed measures are effective to improve the scratching function of the toner supply roll, but unfavorably increase the contact pressure between the toner supply roll and the image developing roll, leading to appearance of torn and worn portions on the image developing roll, deterioration of the particles of the toner (grinding of the toner particles), and excessive electrostatic charging of the toner. Therefore, these measures may cause deterioration of the quality of the reproduced image such as reduction of the toner concentration and undesirable transfer of the toner to local portions of the recording medium where no image should be printed, during long-term use of the roll. It may also be considered to increase the size of cells of a sponge structure of the toner supply roll. In this case, the toner is likely to enter the inside of the sponge structure thorough the cells, resulting in hardening of the sponge structure at the local portions where the toner is entered, whereby the quality of the reproduced image may be deteriorated.

SUMMARY OF THE INVENTION

It is therefore a first object of the present invention to provide a toner supply roll which is less likely to suffer from the conventionally experienced problems of fluffing of the surface of the sponge structure, instability of transfer of the toner, and deteriorated dimensional accuracy.

It is a second object of the present invention to provide a toner supply roll which is less likely to suffer from the conventionally experienced problems of deteriorated durability and generation of foreign matters due to breakage of the skin layer of the sponge structure, and local hardening of the sponge structure due to entry of the toner inside the sponge structure.

It is a third object of the present invention to provide a toner supply roll which has a remarkably improved function of scratching off the toner remaining on the outer circumferential surface of the image developing roll.

It is a fourth object of this invention to provide a method suitable for producing such a toner supply roll, without complicated steps, and with ease.

At least one of the first, second and third objects indicated above may be achieved according to one aspect of the present invention, which provides a toner supply roll comprising a metal shaft, and a cylindrical soft polyurethane sponge structure integrally formed on an outer circumferential surface of the metal shaft. The cylindrical soft polyurethane sponge structure has a hardness of not higher than 350 g, and includes a skin layer. The cylindrical sponge structure further has a network of cells, and the skin layer has an outer circumferential surface and openings which are open in the outer circumferential surface and which communicate with respective ones of the cells which are located adjacent to the skin layer. The openings are substantially aligned with central portions of the respective ones of the cells in axial and circumferential directions of the cylindrical sponge structure. Each of the openings has a size within a range of 100–800 $\mu$m. A total area of the openings is at least 20% of a total area of the outer circumferential surface of the skin layer. The cylindrical sponge structure further has a plurality of protrusions formed on the outer circumferential surface of the skin layer so as to extend linearly or helically in the axial direction of the sponge structure. The protrusions have a height of 20–3000 $\mu$m and are arranged in a circumferential direction of the cylindrical sponge structure with a pitch of 300–3000 $\mu$m, so that the outer circumferential surface of the skin layer are provided with a plurality of recesses each interposed between adjacent ones of the protrusions in the circumferential direction.

In the toner supply roll constructed as described above according to the first aspect of this invention, the cylindrical soft polyurethane sponge structure is formed on the outer circumferential surface of the metal shaft. The skin layer has a generally continuous surface, although the openings communicating with the cells are formed through the skin layer. Since the present toner supply roll is not subjected to such a grinding or polishing process as performed in the conventional method, the surface of the soft polyurethane sponge layer of the present roll is not fluffed with burrs or fuzz, which would cause unstable transfer of the toner from the roll. The present toner supply roll is therefore less likely to suffer from or is free from the deterioration of the quality of the reproduced image and malfunctioning of an image forming apparatus due to the removal of the burrs as foreign matters. Further, the present toner supply roll has improved dimensional accuracy in the absence of the fluffing of the sponge structure.

Further, the toner supply roll constructed as described above according to the first aspect of this invention has a plurality of protrusions formed on the outer circumferential surface of the skin layer so as to extend linearly or helically in the axial direction of the sponge structure, so that a recess is interposed between adjacent ones of the protrusions, whereby the protrusions and recesses are formed on the outer circumferential surface of the skin layer alternately in the circumferential direction of the sponge structure. The toner supply roll whose outer circumferential surface has the protrusions and the recesses is held in rolling contact with the image developing roll under a suitable pressure, so that the toner which remains on the outer circumferential surface of the image developing roll is effectively scratched off by the toner supply roll in the presence of the protrusions and the recesses. Thus, the conventionally experienced problem of variation of the toner concentration of the reproduced image due to the toner remaining on the image developing roll is effectively eliminated.

In addition, the toner supply roll of the present invention is characterized by the openings formed through the portions of the skin layer which are substantially aligned with the center portions of the cells in the axial and circumferential directions of the cylindrical sponge structure. Those portions of the skin layer would be thinned in the presence of the cells located adjacent to the skin layer, if the openings were not formed in those portions. Namely, the openings which are open in the surface of the skin layer and communicate with the cells adjacent to the skin layer make it possible to eliminate those portions of the skin layer which are thinned in the presence of the cells in the conventional toner supply roll. In the present toner supply roll, the skin layer will not be broken or ruptured during use in an image forming apparatus, leading to improved durability and elimination of foreign matters in the absence of fluffing of the skin layer as encountered in the conventional toner supply roll. Further, since the openings are open in the surface of the skin layer and communicate with the cells adjacent to the skin layer, the toner is likely to enter the inside of the sponge structure through the openings, with even distribution of the toner throughout the sponge structure, and can be relatively easily discharged or removed from the sponge structure, whereby the sponge structure is less likely to suffer from local hardening, which is conventionally experienced due to the local breakage of the skin layer and resulting entry and stay of the toner through and within the broken portions of the skin layer.

According to one preferred form of the toner supply roll of the invention, the cylindrical soft polyurethane sponge structure is integrally formed on the outer circumferential surface of the metal shaft by foam molding of a polyurethane material in a mold cavity of a mold, which mold cavity has a configuration corresponding to a desired shape of the sponge structure.

According to another preferred form of the toner supply roll of the invention, each of the plurality of protrusions has a height of 50 μm or more, and a width (W) of each protrusion in the circumferential direction of the cylindrical soft polyurethane sponge structure and a size of (D) of each of the cells are determined such that a ratio (W)/(D) is in a range between 0.7 and 2.0. At least those of the cells which are located adjacent to the skin layer of the protrusions are regularly arranged in a direction of extension of the protrusions.

In the toner supply roll constructed as described above, excessively large cells are less likely to appear in the outer circumferential surface of the soft polyurethane sponge structure, and the size of the cells which are located adjacent to the skin layer of the protrusions is effectively made constant, whereby the toner supply roll of the invention can exhibits excellent quality of the outer circumferential surface of the soft polyurethane sponge structure.

The fourth object may be achieved according to a second aspect of this invention, which provides a method of producing a toner supply roll as described above by foam molding of a polyurethane material in a mold cavity of a mold, which mold cavity has a configuration corresponding to a desired shape of the sponge structure, comprising the steps of: preparing the mold such that a plurality of grooves corresponding to the plurality of protrusions are formed in an inner surface of the mold which defines the outer circumferential surface of the skin layer; processing the inner surface of the mold so that the inner surface has a roughness Rz of 5–20 μm; forming a coating layer of a releasing agent on the inner surface of the mold; disposing the metal shaft in the mold such that the metal shaft and the inner surface of the mold cooperate to define the mold cavity; and introducing the polyurethane material into the mold cavity and causing the polyurethane material to be foamed to generate the cylindrical soft polyurethane sponge structure integrally bonded to the outer circumferential surface of the metal shaft, such that the openings are formed through said skin layer of the cylindrical soft polyurethane sponge structure in communication with the respective ones of the cells adjacent to the skin layer, and such that the plurality of protrusions are formed on the outer circumferential surface of said skin layer, so that the outer circumferential surface of the skin layer are provided with a plurality of recesses each interposed between adjacent ones of the protrusions.

In the method according to the second aspect of the present invention, the toner supply roll is produced by simply foaming the selected polyurethane material in the mold cavity so as to generate the cylindrical soft polyurethane sponge structure on the outer circumferential surface of the metal shaft. The present method does not require cumbersome operations such as cutting, grinding and surface finishing as performed in the known methods, and permit easy and efficient production of the toner supply roll.

The fourth object may also be achieved according to a third aspect of this invention which provides a method of producing a toner supply roll according to the above-described preferred form of the present invention wherein each protrusion has a height of at least 50 μm, by foam molding of a polyurethane material in a mold cavity of a mold, which mold cavity has a configuration corresponding to a desired shape of the sponge structure, comprising the steps of: preparing the mold such that a plurality of projections corresponding to the recesses interposed between adjacent ones of the plurality of protrusions are formed on an inner surface of the mold which defines the outer circumferential surface of the skin layer, so as to provide the recesses and the protrusions on the outer circumferential surface of the skin layer; processing the inner surface of the mold so that the inner surface has a surface roughness Rz of 5–20 μm; forming a coating layer of a releasing agent on the inner surface of the mold; disposing the metal shaft in the mold such that the metal shaft and the inner surface of said mold cooperate to define the mold cavity; and introducing the polyurethane material into the mold cavity and causing the polyurethane material to be foamed to generate the cylindrical soft polyurethane sponge structure integrally bonded to the outer circumferential surface of the metal shaft, such that the openings are formed through said skin layer of the cylindrical soft polyurethane sponge structure in communication with the respective ones of the cells adjacent to the skin layer, and such that the plurality of protrusions are formed on the outer circumferential surface of the skin layer.

In the method according to the third aspect of the present invention, the toner supply roll is produced by simply foaming the selected polyurethane material in the mold cavity so as to generate the cylindrical soft polyurethane sponge structure on the outer circumferential surface of the metal shaft. The present method can assure an easy and efficient production of the toner supply roll which has a structure wherein the cells located adjacent to the skin layer of the protrusions are regularly arranged in the direction of extension of the protrusions, and the size of these cells are effectively made constant, without any special treatments.

BRIEF DESCRIPTION OF THE DRAWINGS

The above and other objects, features and advantages of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
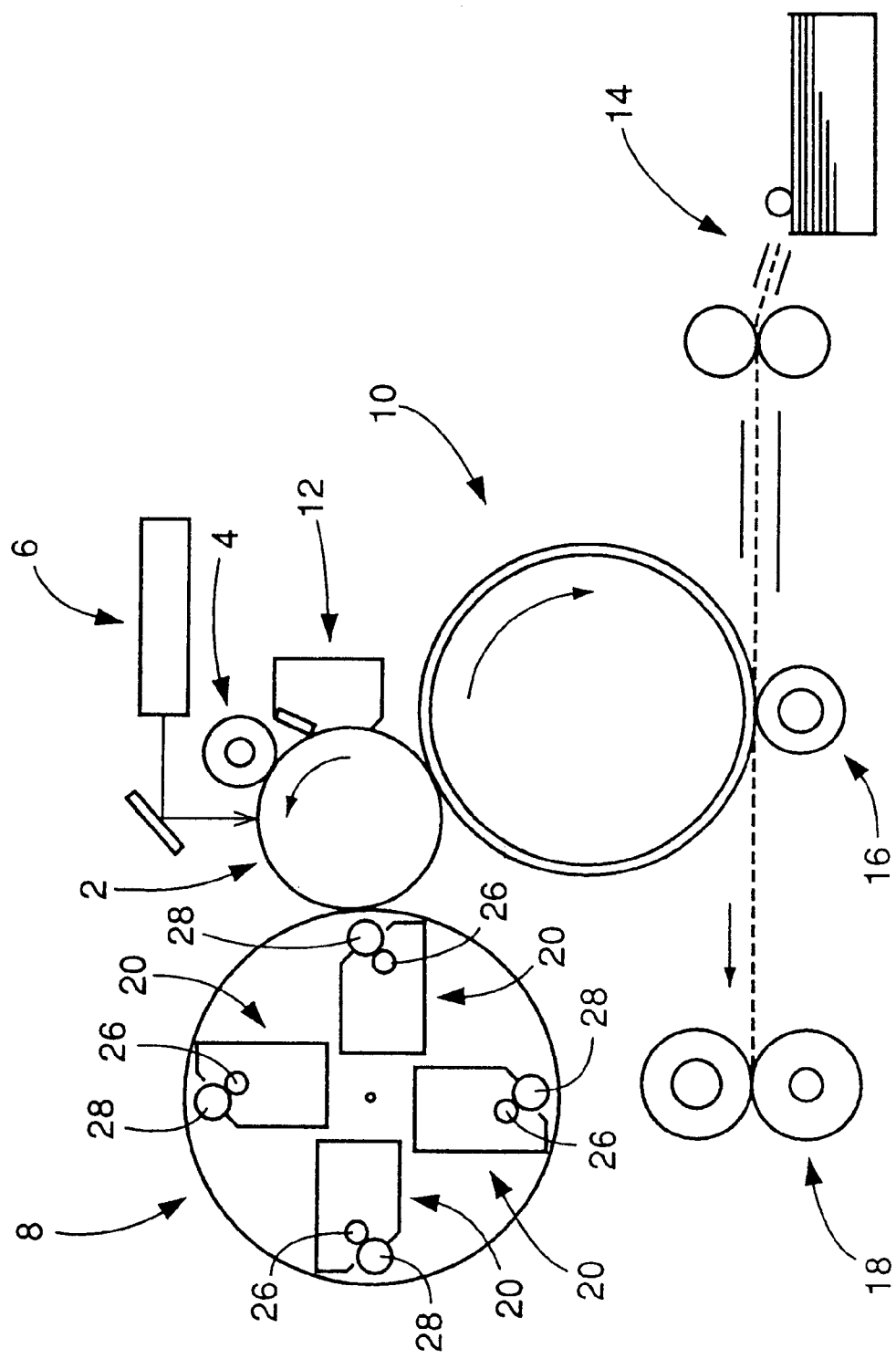
FIG. 1 is a schematic elevational view illustrating a construction of a full-color laser printer using toner supply rolls according to one embodiment of the present invention.

Referring first to FIG. 1, there is schematically shown a full-color laser printer wherein toner supply rolls according to a first embodiment of the present invention are used. The laser printer illustrated in FIG. 1 is equipped with a photosensitive drum 2. Around this photosensitive drum 2, there are arranged a charging roll 4, a laser scanner 6, an image developing device 8, an image transferring drum 10 and a cleaning device 12. A surface of the photosensitive drum 2 is electrostatically charged by the charging roll 4. The laser scanner 6 is adapted to generate a laser beam as image information, which imagewise exposes the surface of the photosensitive drum 2 so as to form an electrostatic latent image corresponding to the image information. The image developing device 8 is provided to apply a powdered toner to the electrostatically charged surface area of the photosensitive drum 2, for thereby forming a visible image which consists of the toner. The visible toner image is transferred from the surface of the photosensitive drum 2 onto a surface of the image transferring drum 10. The cleaning device 12 is adapted to clean up the photosensitive drum 10, that is, to remove residual toner image or residual toner powder, which remains on the surface of the photosensitive drum 2. The toner image transferred onto the transferring drum 10 is further transferred onto a recording surface of a sheet of recording paper, which is fed from a paper supply 14, along a feed path which passes a nip between the image transferring drum 10 and an image transferring roll 16. The toner image transferred onto the recording surface of the sheet is fixed by an image fixing device 18.

The present laser beam printer is adapted to effect full-color printing, that is, the image developing device 8 consists of four developing units 20, which accommodate four kinds of color toners i.e., cyan, yellow, magenta and black toners, respectively. As each color toner, a non-magnetic one-component developer may be employed. The four developing units 20 are disposed around an axis of rotation of the developing device 8 such that the units 20 are equally spaced from each other at an angular interval of 90°. Thus, the photosensitive drum 2 is adapted to contact with each of the developing units 20 each time the developing device 8 is rotated by 90° about its axis, whereby the drum 2 is provided with the four color toners (color developers), so that the latent image formed on the photosensitive drum 2 is developed into a visible color image.

Figure 2:
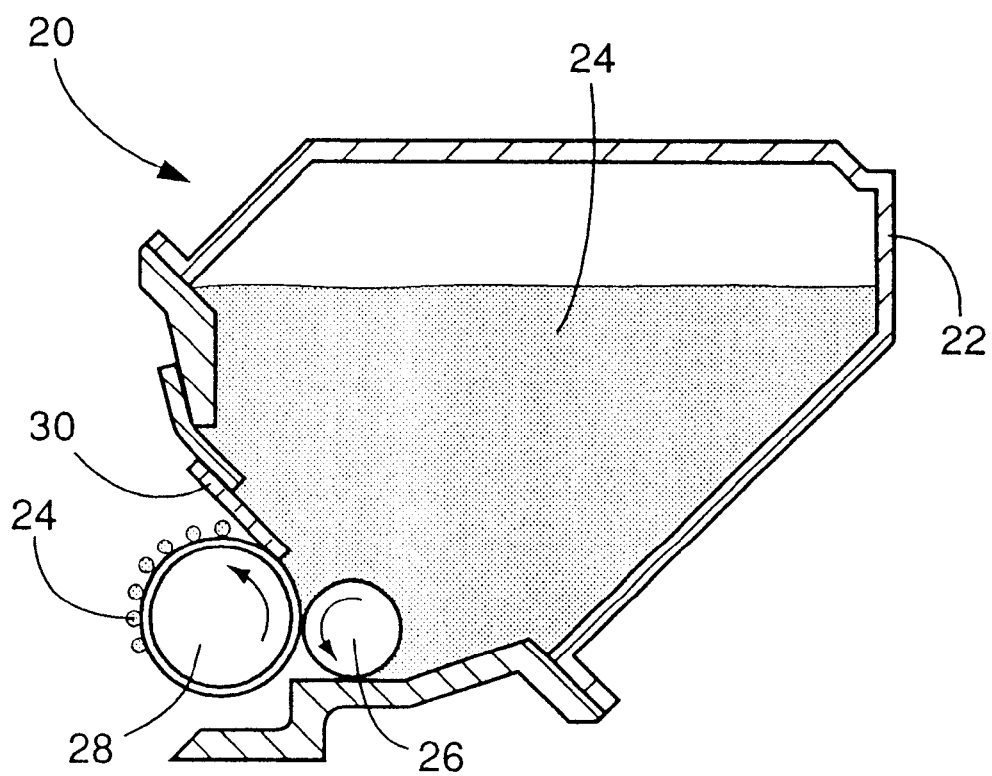
FIG. 2 is an enlarged view in cross section of one of developing units of the laser printer of FIG. 1.

As is clearly shown in FIG. 2, each developing unit 20 of the image developing device 8 comprises a hopper 22 in which a mass of powdered toner 24 as a color developer (non-magnetic one-component developer) is contained. The developing unit 20 further comprises a toner supply roll 26 and a developing roll 28 which are disposed in the lower portion of the hopper 22 such that the toner supply roll 26 and the image developing roll 28 are held in rolling contact with each other under a predetermined pressure and are adapted to rotate in the same direction. As the two rolls are rotated in the same direction (counter clockwise direction as seen in FIG. 2), the toner supply roll 26 removes residual toner powder which remains on the outer circumferential surface of the image developing roll 28, while applying or transferring the toner 24 contained in the hopper 22 to the outer circumferential surface of the image developing roll 28, so that a toner layer is formed on a portion of the outer circumferential surface of the developing roll 28, which portion goes away from the nip between the developing roll and the toner supply roll 26. Near the developing roll 28, there is disposed a toner-layer forming blade 30 by which the thickness of the toner layer formed on the developing roll 28 is suitably regulated. As is apparent from the above description, the surface of the developing roll 28 of each developing unit 20 is brought into contact with the circumferential surface of the photosensitive drum 2 when the developing device 8 is rotated by 90°, so that the powdered toner of the toner layer formed on the developing roll 28 is transferred onto the surface of the photosensitive drum 2, so that the electrostatic latent image formed on the photosensitive drum 2 is developed.

The present invention relates to the toner supply roll 26 used in each developing unit 20 of the developing device 8 which is provided on the laser printer constructed as described above. The toner supply roll 26 includes a center metal shaft and a cylindrical soft polyurethane sponge structure which is integrally formed on the metal shaft by a foam molding. The polyurethane sponge structure has a skin layer having a continuous outer surface, and a multiplicity of cells formed radially inwardly of the skin layer. The cells adjacent to the skin layer are exposed in the surface of the skin layer through openings formed through the skin layer. The polyurethane sponge structure is further characterized in that a plurality of protrusions are disposed on the outer circumferential surface of the sponge structure so as to extend linearly in an axial direction of the toner supply roll 26, so that the outer circumferential surface of the polyurethane sponge structure is also provided with recesses which are interposed between adjacent ones of the protrusions in the circumferential direction of the sponge structure. One example of the toner supply roll 26 according to the first embodiment of the present invention is shown in FIGS. 3(a) and 5.

Figure 3A:
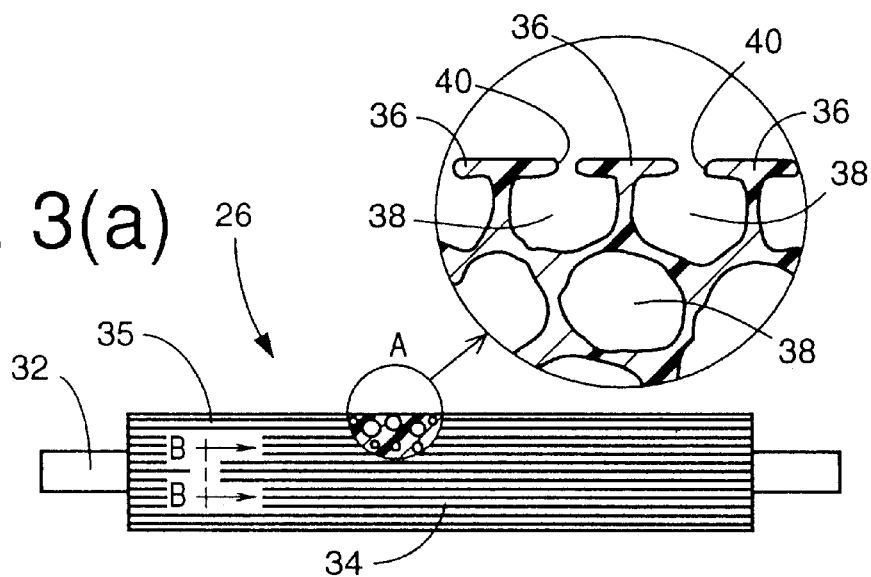
FIG. 3(a) is an enlarged view in cross section of a part of a toner supply roll according to the present invention.

As shown in FIG. 3(a), the toner supply roll 26 consists of a metal shaft 32 which has an axis of rotation, and a cylindrical soft polyurethane sponge structure 34 of independent-cell or closed-cell type which is formed on and integrally with the metal shaft 32. The toner supply roll 26 constructed as described above, may be prepared by disposing the metal shaft 32 in a mold and injecting a polyurethane material into a mold cavity whose configuration corresponds to a desired shape of the toner supply roll 26. In this arrangement, the polyurethane sponge structure 34 having a hardness of not higher than 350 g is formed on and integrally with the metal shaft 32, with a desired wall thickness.

As shown in the enlarged view of FIG. 3(a), the soft polyurethane sponge structure 34 formed on the metal shaft 32 has a skin layer 36 which has a continuous outer surface. Through the skin layer 36, there are formed a multiplicity of openings 40 which communicate with respective cells 38 formed and located adjacent to the skin layer 36 radially inwardly of the sponge structure 34, so that the cells 38 are open in the surface of the skin layer 36 through the openings 40. Each opening 40 has a diameter of 100–800 $\mu$m. Thus, the skin layer 36 is made porous with the openings 40. Each opening 40 is formed in a portion of the skin layer 36 which is located at a central portion of the corresponding cell 38 as seen in the axial and circumferential directions of the cylindrical sponge structure 34. If the openings 40 were not formed, the skin layer 36 has would have the smallest thickness. This arrangement eliminate the conventionally provided thin portions of the skin layer adjacent to the enclosed cells. The thus formed porous skin layer 36 having the openings 40 is free from the conventionally experienced problem of local breakage at its portions adjacent to the enclosed cells during use of the toner supply roll, which breakage would generate foreign substances that may enter the interior of the polyurethane sponge structure 34, namely, into the opened cells.

Figure 4A:
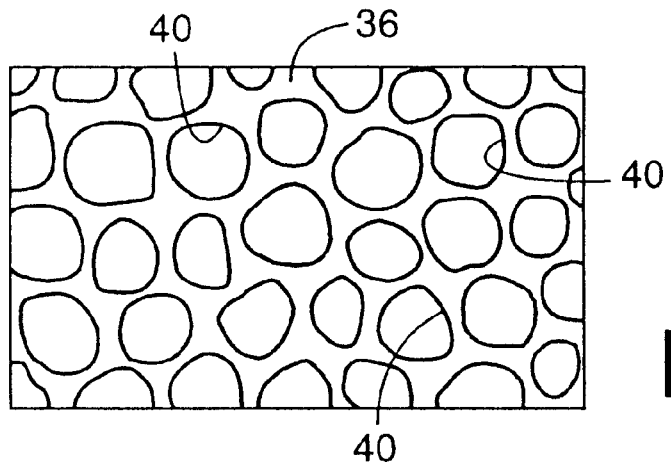
FIGS. 4(a), 4(b), and 4(c) are enlarged views showing a part of a surface of a skin layer of a soft polyurethane sponge structure of each of three examples of the toner supply roll constructed according to the present invention, whose openings in the skin layer have different diameters.
Figure 4B:
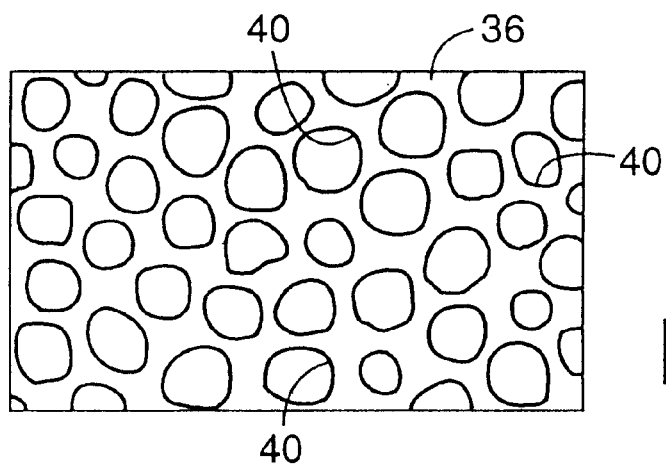
Figure 4C:
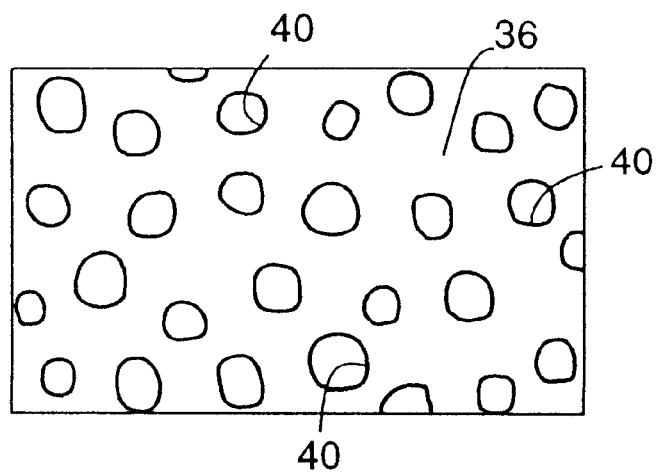

Referring next to the enlarged plane view of FIGS. 4(a), 4(b) and 4(c), there are shown three examples of the skin layers 36, wherein the openings 40 have different sizes or diameters. As clearly shown in these views, all of the skin layers 36 have continuous outer surfaces, although the continuity of the surfaces more or less changes depending on the size of the openings 40. Each skin layer 36 is formed such that the total area of the openings 40 formed in the skin layer 36 is at leased 20% of the total surface area of the skin layer 36 (including the areas of the openings 40). This arrangement is effective to eliminate or reduce the portions of the skin layer 36 which are thinned by the enclosed cells 40 adjacent to the skin layer 36. The present arrangement of the openings 40 is also effective to permit uniform flows of the powdered toner into and out of the open cells of the polyurethane sponge structure 34, thereby preventing local hardening of the polyurethane sponge structure 34. If the percent of the total area of the openings 40 to the total surface area of the skin layer 38 is lower than 20%, the toner supply capacity of the toner supply roll 26 is insufficient, and the polyurethane sponge structure 34 tends to be clogged with the toner. The portion of the polyurethane sponge structure 34 clogged with the powdered toner suffers from excessively high hardness, resulting in deterioration of the quality of an image reproduced by the laser printer. The upper limit of the area percent of the openings 40 with respect to the total area of the skin layer 36 is 80%, and more preferably 70%.

In the toner supply roll 26 constructed according to the first embodiment of the present invention, the openings 40 of the cells 38 located adjacent to the skin layer 36 of the polyurethane sponge structure 34 has a generally circular shape as seen in FIGS. 4. For excellent performance of the toner supply roll 26, the openings 40 are dimensioned such that the diameter of the openings 40 is held within a range of 100–800 $\mu$m, preferably, 200–700 $\mu$m. If the diameter of the openings 40 is smaller than the lower limit of 100 $\mu$m, the powdered toner once admitted into the cells 38 through the openings 40 tends to be hardly discharged from the cells 38, resulting in local hardening of the polyurethane sponge structure 34, and undesirable deterioration of the quality of the reproduced image. If the diameter of the openings 40 is larger than the upper limit of 800 $\mu$m, an amount of the toner supplied from the toner supply roll 26 to the developing roll 28 is unfavorably reduced, also resulting in the image quality deterioration due to reduction of the toner concentration and failure of printing at local portions of the reproduced image.

The soft polyurethane sponge structure 34 may be an independent-cell type or closed-cell cellular structure as described above wherein the cells 38 do not communicate with each other, or an open-cell type or non-cellular structure structure wherein the cells 38 communicate with each other. Preferably, the polyurethane sponge structure 34 is of the independent cell-type. The diameter of the cells 38 formed in the soft polyurethane sponge structure 34 of the toner supply roll 26 according to the first embodiment of the present invention is larger than the diameter of the openings 40. The diameter of the cells 38 is generally 100–1000 $\mu$m, and preferably 300–900 $\mu$m. If the cell diameter is excessively small (smaller than 100 $\mu$m), the diameter of the openings 40 is accordingly reduced, leading to the problem of local clogging of the polyurethane sponge structure 34 with the toner, resulting in local hardening of the toner supply roll 26. If the cell diameter is excessively large, the powdered toner can easily enter the polyurethane sponge structure 34, also leading to significant hardening of the toner supply roll 26, resulting in deterioration of the reproduced image.

Figure 5A:
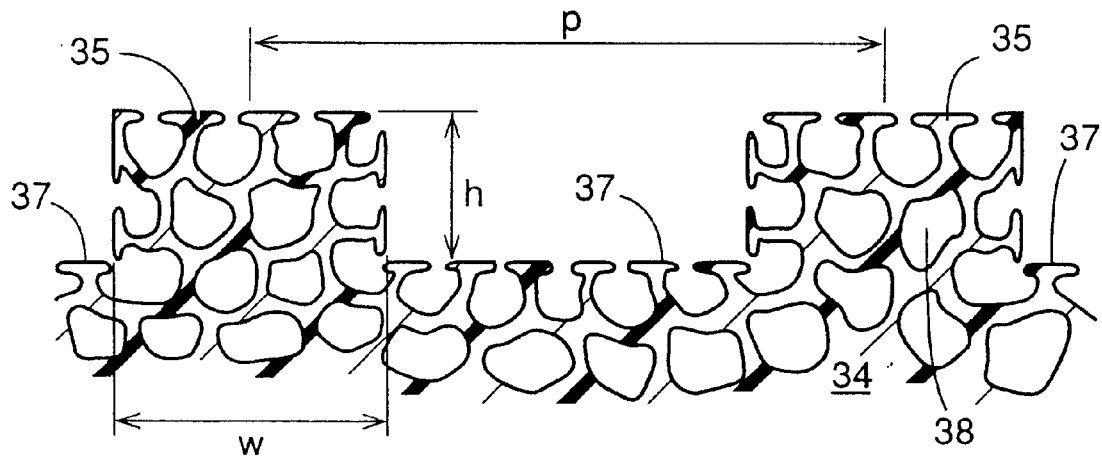
FIGS. 5(a) and 5(b) are fragmentary enlarged views in cross section taken along line B—B of FIG. 3(a) of a soft polyurethane sponge structure of each of two examples of the toner supply roll constructed according to the present invention, whose protrusions have different shapes.
Figure 5B:
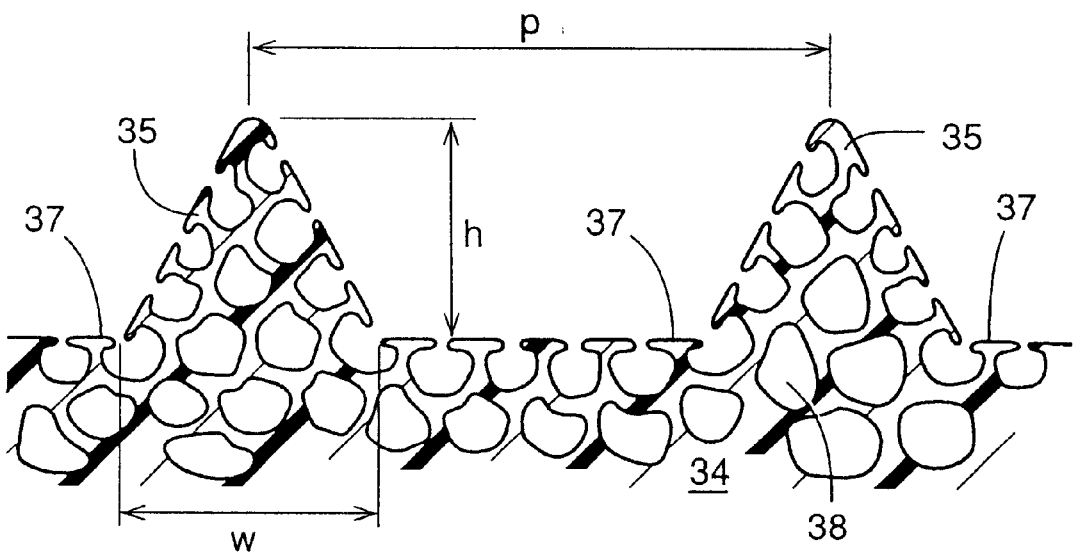

Referring next to the enlarged cross sectional view of FIGS. 5(a) and 5(b), there are shown two examples of the polyurethane sponge structures 34 of the toner supply rolls 26 according to the first embodiment of the present invention, wherein the outer circumferential surfaces of the polyurethane sponge structures 34 have different shapes. As clearly shown in these views, a plurality of protrusions 35, which are formed on the outer circumferential surfaces of the polyurethane sponge structures 34 so as to linearly extends in the axial direction of the sponge structure 34, give recesses 37 which are interposed between the adjacent protrusions on the outer circumferential surfaces of the polyurethane sponge structures 34 in the circumferential direction of the sponge structure 34. That is, the protrusions 35 and the recesses 37 are formed alternately in the circumferential direction of the sponge structure 34. The protrusions 35 have a height (h) which is held within a range of 20–3000 $\mu$m, preferably, 50–1000 $\mu$m, and are arranged in the circumferential direction of the polyurethane sponge structure with a pitch (p) of 300–3000 $\mu$m, preferably, 500–2000 μm. If the values of height (h) and pitch (p) are smaller than the respective lower limits of 20 μm and 300 μm, the toner supply roll 26 suffers from deterioration of its function of scratching off the residual toner 24 remaining on the outer circumferential surface of the developing roll 28. If the height (h) of the protrusions 35 is larger than the upper limit of 3000 μm, the protrusions 35 at which the toner supply roll 26 is held in pressing contact with the image developing roll 28, tend to be deformed due to the pressure at the nip, while the color laser printer is not in operation, leading to deterioration of the reproduced image. If the pitch (p) of the protrusions 35 is larger than the upper limit of 3000 μm, a frictional force generated between the toner supply roll 26 and the image developing roll 28 is lowered when the recesses 37 interposed between the adjacent protrusions 35 contact with the image developing roll 28. Accordingly, the thickness of the toner layer formed on the image developing roll 28 is reduced at the local portions of the roll 28 which contact with the respective recesses 37, whereby the thickness of toner layer formed on the outer surface of the image developing roll 28 varies in the form of stripes, resulting in variation of the toner concentration of the reproduced image.

The shapes in traverse cross section of the protrusions 35 formed on the outer circumferential surface of the polyurethane sponge structure 34 and recesses 37 interposed between the adjacent protrusions 35 are not specifically limited. For instance, there is preferably employed a combination of rectangular protrusion and recess 35, 37 as shown in FIG. 5(*a*), or a combination of a triangular protrusion 35 and a trapezoidal recess 37 as shown in FIG. 5(*b*). Generally, each of the protrusions 35 have a width of 150–2000 μm in the circumferential direction of the polyurethane sponge structure 34 at a bottom portion thereof, and each of the recesses 37 interposed between the adjacent protrusions 35 has a width of 100–1500 μm in the circumferential direction of the polyurethane sponge structure 34 at a bottom portion thereof.

Figure 6A:
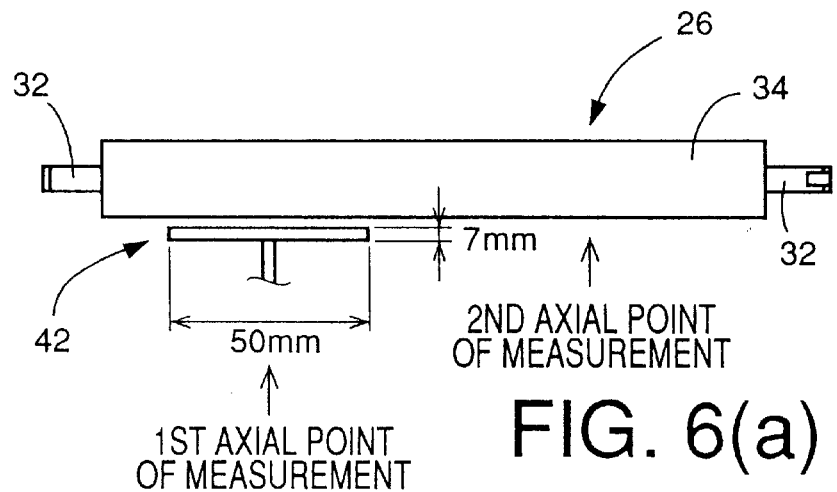
FIGS. 6(a) and 6(b) are respectively a plane view and an end view of the toner supply roll according to the present invention, both of which illustrate a method of measuring the hardness of the soft polyurethane sponge structure of the toner supply roll.
Figure 6B:
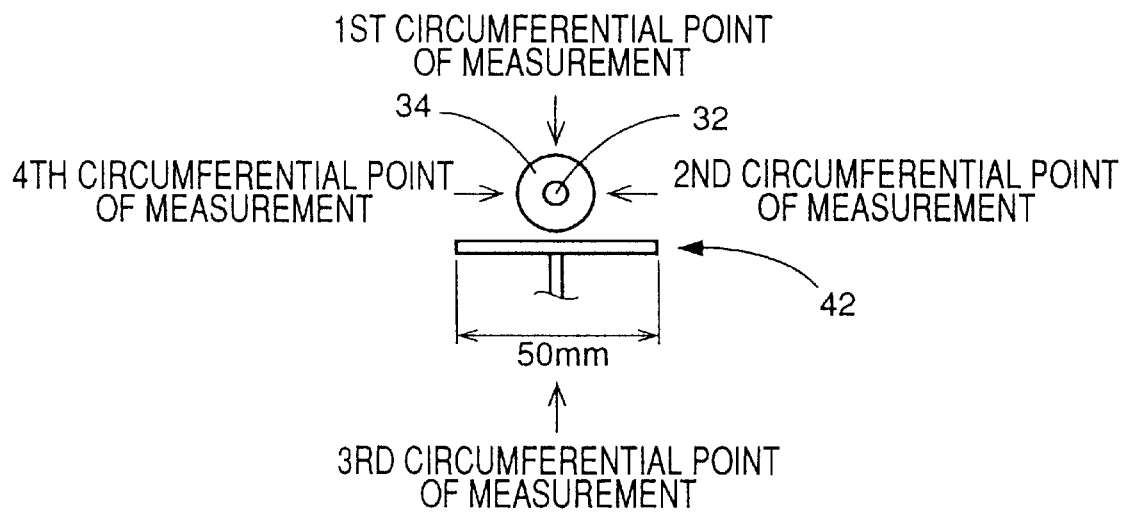

Further, the soft polyurethane sponge structure 34 of the toner supply roll 26 constructed according to the first embodiment of the present invention is required to have a hardness of 350 g or lower. If the hardness of the toner supply roll 26 exceeds the upper limit of 350 g, the function of the roll 26 to supply the toner 24 to the developing roll 28 is deteriorated, so that the image reproduced on the developing roll 28 is deteriorated. This deterioration can be confirmed by a test operation on the laser printer using the toner supply roll 26 under a low-temperature and low-humidity condition, namely at 15° C. and 10% humidity. The hardness of the toner supply roll 26 as described above is measured as shown in FIGS. 6(*a*) and 6(*b*). Namely, the toner roll 26 is supported at the opposite axial ends of the metal shaft 32, as illustrated in FIGS. 6(*a*) and 6(*b*). A part of the polyurethane sponge structure 34 of the toner supply roll 26 is pressed at a speed of 10 mm/min, by a jig 42 including a presser plate which has a thickness of 7 mm. The presser plate is a rectangular plate having a dimension of 50 mm as measured in the axial direction of the toner supply roll 26 as indicated in FIG. 6(*a*), and a dimension of 50 mm as measured in the diametric direction of the roll 26 as indicated in FIG. 6(*b*). A load (g) is applied to the surface of the sponge structure 34 in the radial direction to cause radial displacement of 1 mm of the sponge structure 34. This load (in gram) which has caused the 1 mm radial displacement represents the hardness of the sponge structure 34. The hardness of the polyurethane sponge structure 34 increases with an increase of the applied load (g). As is apparent from FIGS. 6(*a*) and 6(*b*), the applied load (g) is measured at two axial points of the toner supply roll 26 which are spaced apart from each other by a suitable distance in the axial direction, and at four circumferential points of the toner supply roll 26 which are equally spaced apart from each other at an angular interval of 90°. Thus, the load applied to the toner supply roll 26 is measured at a total of eight points. An average of the eight load values measured represents the hardness of toner supply roll 26. The soft polyurethane sponge structure 34 having the hardness of not higher than 350 g as described above may be easily obtained by selecting the composition of the soft polyurethane material and the amount of the material injected into the mold. Especially, the polyurethane sponge structure 34 having a desired hardness corresponding to the specific amount of the material can be obtained by using a mold which employs a pipe as described below.

The skin layer 36 and the adjacent cellular structure of the toner supply roll 26 as shown in FIG. 3(*a*) according to the first embodiment of the present invention is distinguished from the surface structure of the known toner supply rolls formed according to the conventional methods as described above, which are shown in FIGS. 3(*b*) and 3(*c*).

Figure 3B:
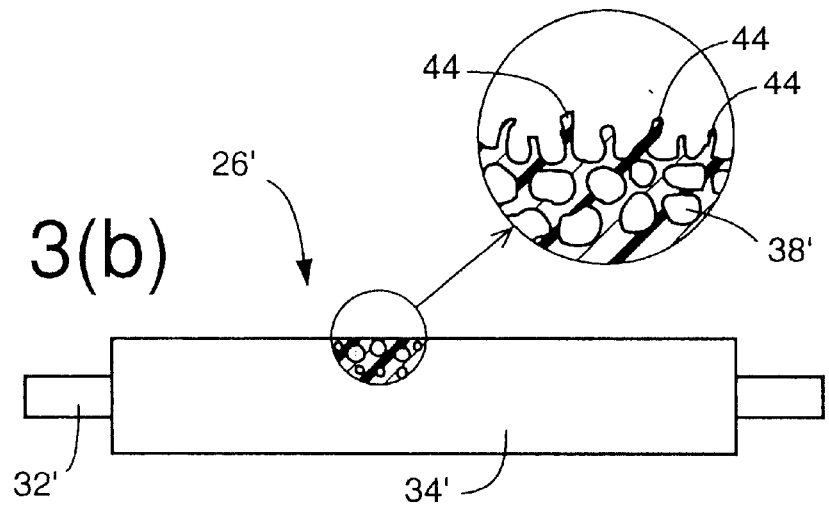
FIG. 3(b) and FIG. 3(c) are enlarged cross sectional views which respectively show examples of known toner supply rolls produced according to conventional methods.
Figure 3C:
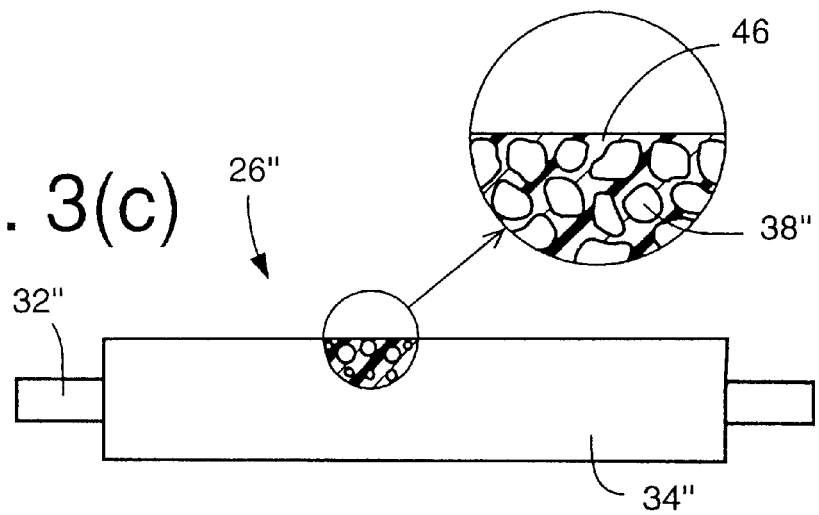

Namely, the toner supply roll 26' shown in FIG. 3(*b*) is formed according to the conventional method (A) or (B) described above, wherein the polyurethane sponge structure 34' formed on the metal shaft 32' is subjected to a grinding or polishing operation on its surface, so that the ground or polished surface of the polyurethane sponge structure 34' is fluffed with burrs or fuzz 44. The burrs 44 may be peeled off from the surface of the polyurethane structure 34'. The removed burrs 44 may be removed as foreign matters in the laser printer, and may lower the dimensional accuracy of the toner supply roll 26'. Referring next to FIG. 3(*c*), the toner supply roll 26" shown therein is formed according to the conventional method (C) described above, wherein the polyurethane sponge structure 34" is formed around the metal shaft 32". On the surface of the polyurethane sponge structure 34", there is formed a skin layer 46 as indicated in enlargement FIG. 3(*c*). In the toner supply roll 26", cells 38" disposed adjacent to the skin layer 46 are not open in the surface of the skin layer 46, so that the thickness of the skin layer 46 is reduced at portions thereof right above the cells 38". Thus, the thinned portions of the skin layer 46 tend to be easily broken or torn, causing fragments of the skin layer 46 to be removed as foreign substances. Further, through the thus opened portions of the skin layer 46, the toner may enter the inside of the polyurethane sponge structure 34, resulting in local hardening of sponge structure 34".

In the toner supply roll 26 according to the first embodiment of the present invention as shown in FIG. 3(*a*), the skin layer 36 has a generally continuous circumferential surface. The skin layer 36 assures improved dimensional accuracy of the roll 26. Further, the skin layer 36 has the openings 40 communicating with the cells 38. Since the openings 40 are located at the portions of the skin layer 36 which are aligned with the central portions of the cells 38 in the axial and circumferential directions of the cylindrical sponge structure 34 (metal shaft 32), the skin layer 36 does not have the thinned portions as provided in the skin layer 36 of the conventional roll 26" of FIG. 3(*c*). Thus, the present toner supply roll 26 effectively eliminates the conventional problems of fluffing on the surface of the toner supply roll and removal of burrs 44 from the surface of the toner supply roll, and removal of fragments of the skin layer. Further, the local hardening of the sponge structure 34 is not caused, since the toner 24 does not enter the cellular portion of the sponge structure 34.

In the toner supply roll 26 according to the first embodiment of the present invention, moreover, the plurality of the protrusions 35 each having a predetermined height, which protrusions are disposed on the outer circumferential surface of the polyurethane sponge structure 34 so as to extend linearly in the axial direction of the sponge structure 34, namely, so as to extend parallel to the axis of the toner supply roll 26, and are arranged in the circumferential direction of the polyurethane sponge structure 34 with a predetermined pitch, so that the outer circumferential surface of the polyurethane sponge structure 34 is provided with the plurality of alternate protrusions and recesses. The toner supply roll 26 whose outer circumferential surface has the protrusions 35 and recesses 37 is in rolling contact with the image developing roll 28 and is rotated with the developing roll 28 in the same direction, whereby the residual amount of the toner 24 remaining on the outer circumferential surface of the image developing roll 28 is effectively scratched off or removed by the outer circumferential surface of the toner supply roll 26. Since the remaining toner 24 is effectively removed from the outer circumferential surface of the image developing roll 28, the toner supply roll 26 can evenly distribute the toner 24 and provide the toner layer having a desired uniform thickness on the outer circumferential surface of the image developing roll 28, resulting in elimination of the conventionally experienced problem of variation of the toner concentration of the reproduced image.

The toner supply roll 26 constructed according to the first embodiment of the present invention may be easily produced according to various methods known in the art. For effectively producing the toner supply roll 26 of the first embodiment of the present invention, the following first method of production may be employed. According to the first method of producing the toner supply roll 26, the soft polyurethane sponge structure 34 is formed by simple foam molding of the polyurethane material, such that the openings 40 are formed through the skin layer 36, so that the cells 38 adjacent the skin layer 36 are open to the atmosphere through the openings 40, and such that the plurality of protrusions 35 are formed on the outer circumferential surface so as to extend in the axial direction of the sponge structure 34, and are arranged in the circumferential direction of the sponge structure 34 with a predetermined pitch, so that the outer circumferential surface of the polyurethane sponge structure 34 are provided with the protrusions 35 and the recesses 37.

Namely, according to the first method of producing the toner supply roll 26 of the first embodiment of the present invention by foam molding of a polyurethane material in a mold cavity of a mold, which mold cavity has a configuration corresponding to a desired shape of the sponge structure, the mold is prepared such that a plurality of grooves which correspond to the plurality of protrusions 35 and which give the protrusions 35 and the recesses 37 on the outer circumferential surface of the sponge structure 34, are formed in an inner surface of the mold which defines the outer circumferential surface of the sponge structure 34, while the inner surface of the mold is processed to have a surface roughness of Rz 5–20 μm, and a coating layer of a mold releasing agent on the inner surface of the mold. Then, the foam-molding of the polyurethane material is executed in the mold as follows. Namely, the metal shaft 32 is disposed in the mold cavity, and then the polyurethane material is introduced into the mold cavity. The polyurethane material is foamed in the mold, so that the soft polyurethane sponge structure 34 is formed on the outer circumferential surface of the metal shaft 32, such that the skin layer 36 is formed so as to provide the outer circumferential surface of the polyurethane sponge structure 34. The skin layer 36 has the openings 40 which are formed through the skin layer 36 at respective portions of the skin layer 36, through which the cells 38 located radially inwardly adjacent to the skin layer 36 are open to the atmosphere. Moreover, the outer circumferential surface of the polyurethane sponge structure 34 is provided with the plurality of protrusions 35 each extending in the axial direction of the sponge structure 34, by transfer a shape of the grooves formed in the inner surface of the mold to the outer circumferential surface of the sponge structure 34.

When the polyurethane material in a liquid state is foamed in the mold constructed as described above, the coating layer of the mold releasing agent is formed on the inner surface of the mold, i.e., on the inner circumferential surface of the mold cavity which defines the configuration of the outer circumferential surface of the polyurethane sponge structure 34. The formed layer of the mold releasing agent exhibits water repellency and surface tension with respect to the polyurethane material. Further, the inner surface of the mold is suitably adjusted to a desired roughness (Rz). As a result, the polyurethane material is absent at those portions of the skin layer 36 which are adjacent to the cells 38 formed in the polyurethane sponge structure 34, i.e., at the portions of the skin layer 36 which are aligned with the center portions of the cells 38 adjacent to the skin layer 36 and which would otherwise be thinned. Thus, the openings 40 are formed through the skin layer 36 of the polyurethane sponge structure 34, so that the cells 38 are open in the surface of the skin layer 36. Moreover, the inner surface of the mold cavity, which defines the outer circumferential surface of the polyurethane sponge structure 34, is provided with the grooves each of which extends in the axial direction of the mold, so that the obtained toner supply roll 26 is provided with the protrusions 35 which are formed on the outer circumferential surface so as to extend in the axial direction of the toner supply roll 26.

In the first method of producing the toner supply roll 26, the grooves are formed in the inner surface of the mold or the mold cavity so as to extend linearly in the axial direction of the mold. The mold defines the configuration of the outer circumferential surface of the polyurethane sponge structure 34. The formed grooves provide the outer circumferential surface of the roll with the plurality of protrusions 35 and the recesses 37. The inner surface of the mold is subjected to a roughing process as well known in the art, such as shot blasting, such that the inner surface of the mold has the surface roughness (Rz) of 5–20 μm. If the surface roughness (Rz) of the inner surface of the mold is smaller than the lower limit of 5 μm, the openings 40 formed in the skin layer 36 of the polyurethane sponge structure 34 do not have a sufficiently large size. On the other hand, if the surface roughness (Rz) of the inner surface of the mold exceeds the upper limit of 20 μm, the obtained toner supply roll 26 cannot be easily removed from the mold, without breakage or tearing of the skin layer 36 and breakage or damage of the sponge structure 34.

For forming the grooves corresponding to the protrusions 35 in the inner surface of the mold cavity, various methods known in the art may be employed. To obtain the desired inner surface of the mold cavity, the mold may be processed by etching, electric discharge machining (wire cutting), broaching or the like, for example. The mold may also be subjected to an electro-forming or casting so that the desired shape is effectively transferred to the inner surface of the mold.

The above-mentioned first method further comprises the step of forming the coating layer of the mold releasing agent on the inner surface of the mold which have been processed to have the specific configuration corresponding to the outer circumferential surface of the desired toner supply roll 26 and to have a roughness (Rz) of 5–20 μm. The coating layer may consist of any mold releasing agent which is well known in the art. Preferably, a releasing agent of silicone resin type or fluororesin type, namely a releasing agent including modified silicone resin fluororesin or modified fluororesin, as a major component, may be used. Generally, the coating layer has a wall-thickness of about 1–10 μm. If the wall thickness of the coating layer is smaller than the lower limit of 1 μm, the coating layer cannot function as desired. If the wall thickness of the coating layer is larger than the upper limit of 10 μm, the surface condition of the polyurethane sponge structure 34 foamed in the mold is deteriorated. The mold releasing agent of silicone resin type or fluororesin type is preferably applied to the inner surface of the mold and then is preferably cured by heat, whereby the strength of the coating layer is effectively increased.

As the mold used in the first method of the present invention as described above, a mold using a pipe as shown in FIGS. 7(a) and 7(b), namely, so-called a pipe type mold is preferably used. The inner surface of the pipe partly defines the mold cavity corresponding to the specific configuration of the soft polyurethane sponge structure 34 of the toner supply roll 26.

Figure 7A:
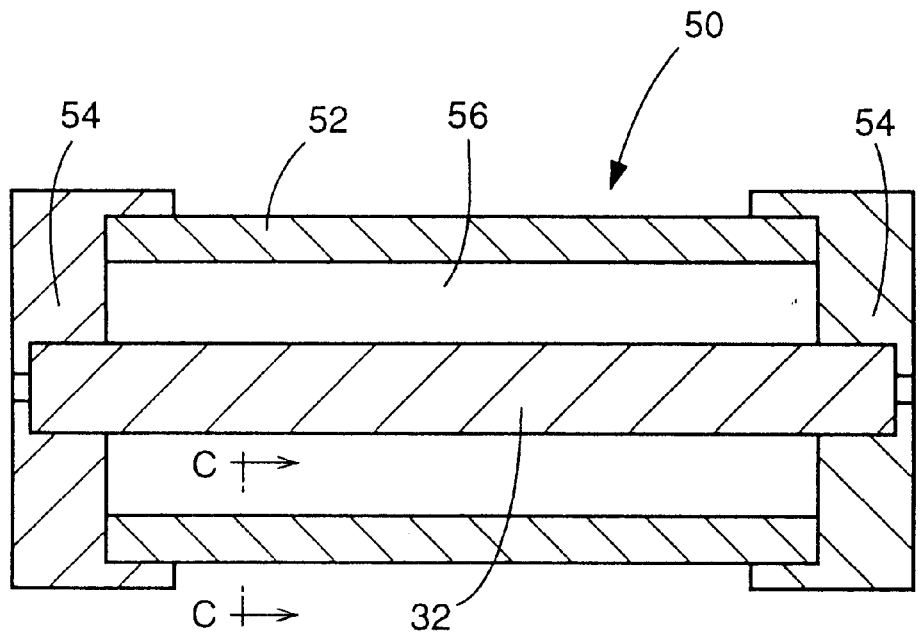
FIGS. 7(a) and 7(b) are respectively a longitudinal cross sectional view and a fragmentary enlarged view in cross section taken along line C—C of FIG. 7(a), of one example of a mold which is used in one preferred embodiment of a method of producing the toner supply toll of the present invention.

Referring to FIG. 7(a), there is shown a mold 50 which comprises a pipe 52 the axial length of which is equal to that of the soft polyurethane sponge structure 34, and a pair of end caps 54, 54 which are fixed to the opposite axial open ends of the pipe 52, respectively so as to close these open ends. The metal shaft 32 is disposed inside the pipe 52 and is supported at its axial ends by the pair of end caps 54, 54, respectively, such that the metal shaft 32 is coaxial with the pipe 52. Thus, a desired mold cavity 56 is defined by the pipe 52, metal shaft 32 and end caps 54. This mold cavity 56 is adapted to form the sponge structure 34 having the desired configuration (outside diameter) and axial length.

Figure 7B:
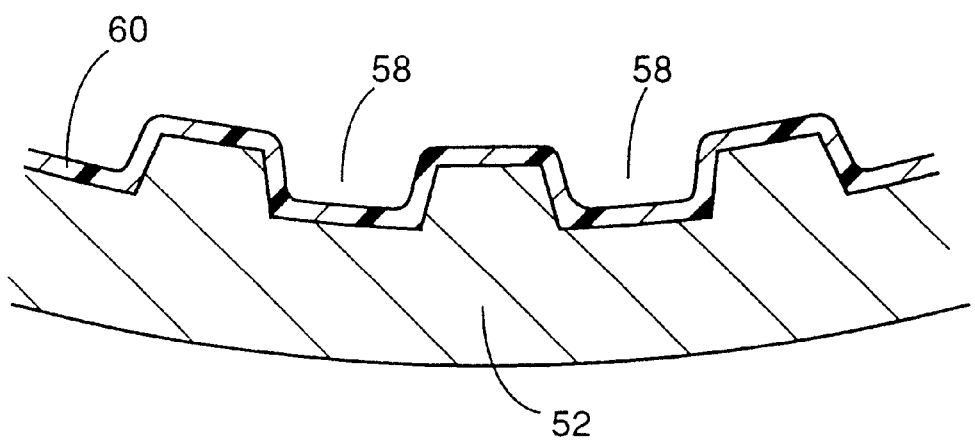

Referring next to the enlarged view of FIG. 7(b), there is shown a part of the inner surface of the pipe 52 of the mold 50. In the inner surface of the pipe 52, there are formed grooves 58, which correspond to the protrusions 35 formed on the outer circumferential surface of the desired toner supply roll 26, so as to extend linearly in axial direction of the pipe 52. The inner surface of the pipe 52 is processed to have the predetermined roughness (Rz). A coating layer 60 which consists of a mold releasing agent of silicone resin type or fluororesin type is formed on the inner surface of the pipe 52 with the predetermined thickness.

In the first method of producing the toner supply roll according to the first embodiment of the present invention, the soft polyurethane sponge structure 34 is formed by foam-molding of the polyurethane material in the mold cavity 56 of the mold 50. The polyurethane material is introduced into the mold cavity 56, in a liquid state, as in the conventional method, and may be selected preferably from known groups of reactive materials such as a mixture of polyol and polyisocyanate, which are foamed and cured in the mold.

More specifically described, the polyol component of the liquid polyurethane material may be any one of polyols selected from the group consisting of polyether polyol, polyester polyol, polymer polyol, and the like, which are conventionally used in the art to make a soft polyurethane foam in general. The polyisocyanate component, on the other hand, may be any one of polyisocyanates having at least two functional groups as well known in the art. More specifically, the polyisocyanate component may preferably include at least one of 2,4- and 2,6-tolylenediisocyanate (TDI), orthtoluidinediisocyanate (TODI), naphthylenediisocyanate (NDI), xylenediisocyanate (XDI), 4,4'-diphenylmethanediisocyanate (MDI), MDI modified by carbodiimide, polymethylene polyphenylisocyanate, polymeric polyisocyanate, and the like. Any one of these polyisocyanate components may be used alone, or any combination of these components may be used.

To the polyurethane material including the polyol and polyisocyanate components, there may be added a crosslinking agent, a foaming agent (e.g., water, a substance having a low boiling point, or a gas), a bubble-controlling agent, a surface active agent, a catalyst, or the like, to provide a reactive foamable composition which is suitable to obtain the desired polyurethane sponge structure 34 by foaming, namely, the sponge structure having a network of cells which are independent of each other. The reactive foamable composition may further comprise a fire retardant and/or a filler as needed, and may further comprise an electrically conductive additive and/or an antistatic agent, as used in the conventional method. The electrically conductive additive is used to give the desired electrical conductivity to the toner supply roll.

The liquid polyurethane material is injected into the mold cavity 56 of the mold 50 as shown in FIG. 7(a), and then the material is foamed as in the conventional method. In this case, the starting polyurethane material is generally expanded by about 5–20 times. The material thus foamed in the mold cavity 56 gives the soft polyurethane sponge structure 34 formed on the metal shaft 32 such that the hardness of the polyurethane sponge structure 34 is 350 g or lower, each opening 40 has the diameter of 100–800 μm, and the total area of the openings 40 is at least 20% of the total surface area of the skin layer 36, while the outer circumferential surface of the sponge structure 34 is formed with the protrusions 35 and the recesses 37 which are formed so as to so as to extend in the axial direction of the sponge structure 34. The obtained toner supply roll 26 removed from the mold 50 is provided with the skin layer 36 having the mutually independent openings 40 which are open in the skin layer 36 and which communicate with the cells 38 adjacent to the skin layer 36. The openings 40 are given the suitable size owing to the properties of the inner surface of the mold 50, i.e., the inner surface of the pipe 52, as described above. The formed polyurethane sponge structure 34 may preferably be processed by crushing with compressed air having a suitable pressure being blown against the surface of the polyurethane sponge structure 34. For forming the independent-cell type polyurethane sponge structure 34, it is desirable that the polyurethane material be mechanically foamed. In this case, it is desirable to reduce the pressure of the compressed air used in the crushing process.

According to the first embodiment of the present invention, the toner supply roll 26 as obtained by foaming the polyurethane material in the mold can be used as a component of each developing unit 20. Thus, the cumbersome procedure such as a grinding step which is required in the conventional method may be eliminated according to the first embodiment of the present invention. Thus, the toner supply roll may be simply produced according to the first embodiment of the present invention. Moreover, the toner supply roll 26 according to the first embodiment of the present invention has improved dimensional accuracy and is free from the burrs or fuzz formed on the surface of the toner roll 26, breakage of the skin layer 36, and removal of fragments from the sponge structure 34. The toner supply roll 26 according to the first embodiment of the present invention further has an improved function of scratching off the residual toner from the outer circumferential surface of the image developing roll 28.

Figure 8A:
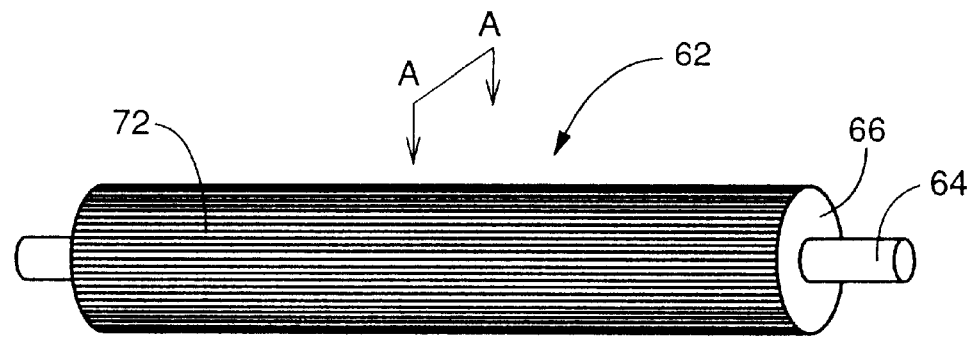
FIG. 8(a) is a perspective view of a toner supply roll according to another preferred embodiment of the present invention.
Figure 8B:
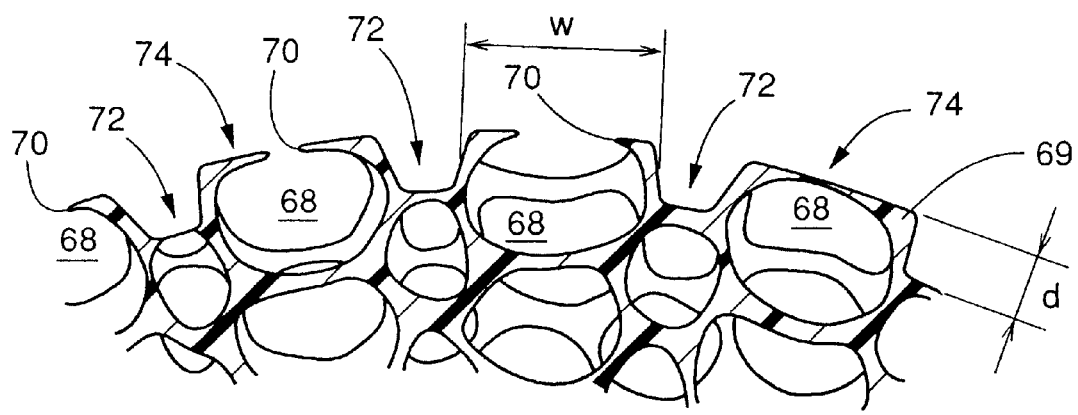
FIG. 8(b) is a fragmentary enlarged view in cross section taken along line A—A of FIG. 8(a) of the toner supply roll.

Referring next to FIGS. 8(a) and 8(b), there is illustrated a toner supply roll 62 constructed according to a second embodiment of the present invention. The toner supply roll 62 is also used in each developing unit 20 of the developing device 8 which is provided on the full-color laser printer illustrated in FIG. 1. The toner supply roll 62 includes a center metal shaft and a cylindrical soft polyurethane sponge structure which is integrally formed on the metal shaft by foam molding. The polyurethane sponge structure has a skin layer having a continuous outer surface, and a multiplicity of cells formed radially inwardly of the skin layer. The cells adjacent to the skin layer are open in the surface of the skin layer through openings formed through the skin layer. The polyurethane sponge structure further has a plurality of recesses which are formed on the outer circumferential surface so as to extend linearly or helically in the axial direction of the toner supply roll 62, so that the outer circumferential surface of the sponge structure is provided with the recesses and the protrusions interposed between adjacent ones of the recesses.

As shown in FIG. 8(a), the toner supply roll 62 consists of a metal shaft 62 and a cylindrical soft polyurethane sponge structure 66 of independent-cell type which is formed on and integrally with the metal shaft 64 with a suitable wall thickness. The toner supply roll 62 constructed as described above, may be prepared by disposing the metal shaft 64 in a mold as shown in FIG. 7(a) and injecting a polyurethane material into a mold cavity whose configuration corresponds to a desired shape of the toner supply roll 62. In this arrangement, the polyurethane sponge structure 66 having a hardness of not higher than 350 g is formed on and integrally with the metal shaft 64 with the suitable thickness.

As shown in the fragmentary enlarged view of FIG. 8(b), which is a cross sectional view taken along line A—A of FIG. 8(a), the polyurethane sponge structure 66 formed on and integrally with the metal shaft 64 has a skin layer 69 which has a continuous outer surface. Through the skin layer 69, there are formed a multiplicity of openings 70 which communicate with respective cells 68 formed and located adjacent to the skin layer 69, so that the cells 68 are open in the surface of the skin layer 69 through the openings 70. The polyurethane sponge structure 66 further has a plurality of recesses 72 disposed on the outer circumferential surface of the polyurethane sponge structure 66 so as to extend in the axial direction. The recesses 72 are arranged in the circumferential direction of the sponge structure 66, such that the recesses 72 and the protrusions 74 are alternately arranged in the circumferential direction of the sponge structure 66, like the protrusions 35 and the recesses 37 of the toner supply roll 26.

According to the second embodiment of the present invention, each of the recesses 72 has a depth of at least 50 $\mu$m, and a width (W) of each of the protrusions 74 in the circumferential direction of the polyurethane sponge structure 66 and a size (D) of each of the cells 38 (an average diameter of the cells 38) are determined such that a ratio (W)/(D) is within a range between 0.7 and 2.0. In this arrangement, at least those of the cells 38 which are located adjacent to the skin layer 69 of the protrusions 74 are regularly arranged in the direction of extension of the protrusions 74.

If the depth of each recess 72 is smaller than 50 $\mu$m, those cells 38 located adjacent to the skin layer 69 is less likely to be regularly arranged along the recesses 72. In the second embodiment of the present invention, each recess 72 formed on the outer circumferential surface of the polyurethane sponge structure 66 has a depth (d) of at least 50 $\mu$m, preferably at least 100 $\mu$m. The upper limit of the depth (d) of the recesses 72, a pitch of the recesses 72 in the circumferential direction of the sponge structure 66 and a width of the recesses 72 in the circumferential direction of the sponge structure at their bottom portions are suitably determined. Generally, the recesses 72 has the depth (d) of not greater than 3000 $\mu$m, preferably not greater than 1000 $\mu$m, and are arranged in the circumferential direction of the polyurethane sponge structure with a pitch of 300–3000 $\mu$m, preferably 500–2000 $\mu$m.

Figure 9A:
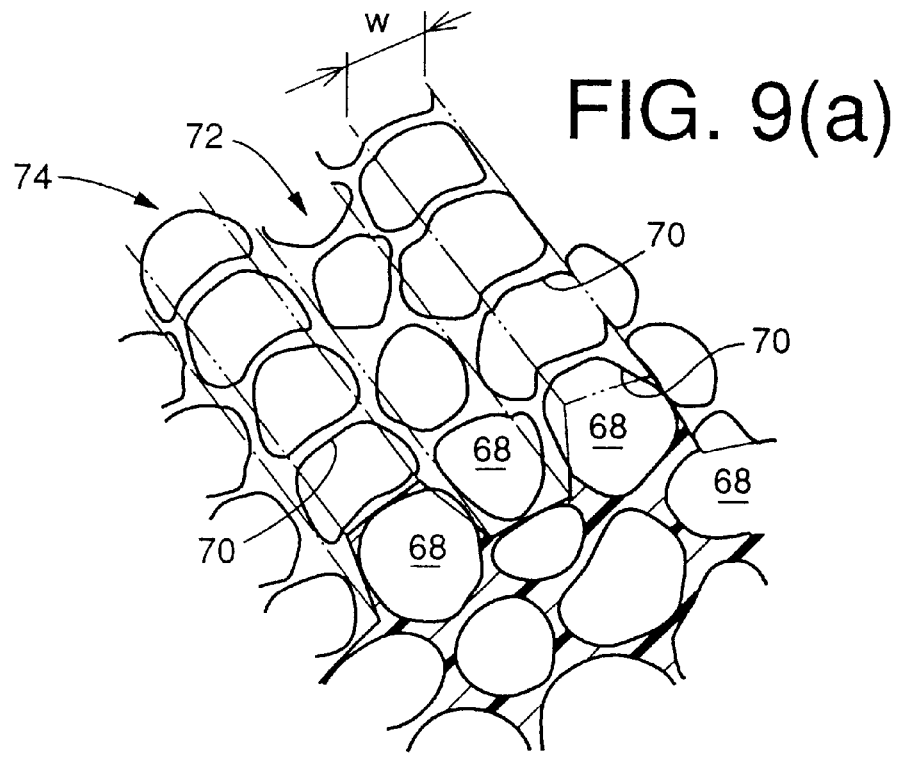
FIG. 9(a) is an enlarged perspective view showing a part of a surface of a soft polyurethane sponge structure of a toner supply roll according to another preferred embodiment of the present invention.
Figure 9B:
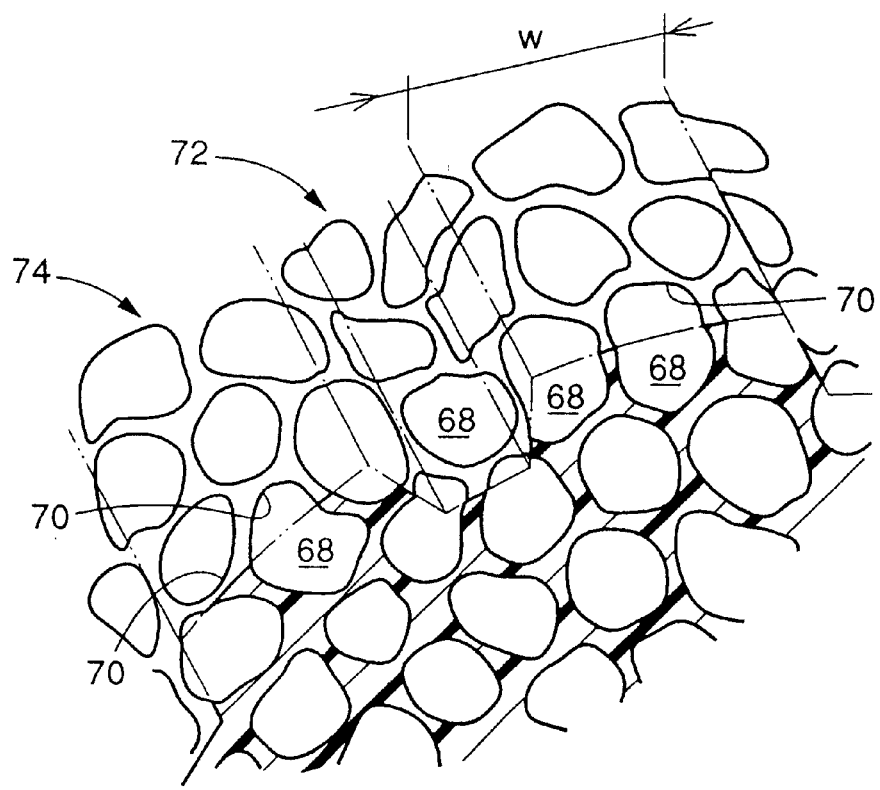
FIG. 9(b) is an enlarged perspective view showing one example of a toner supply roll which is not constructed according to the principle of the present invention.

According to the second embodiment of the present invention, the ratio (W)/(D) of the width (W) of the protrusions 74 interposed between the adjacent recesses 72 to the size (D) of each of the cells 68 is suitably determined, so that those cells 68 which are located adjacent to the skin layer 69 and within each of the protrusions 74 are regularly arranged. If the ratio (W)/(D) is lower than 0.7, those cells 38 located adjacent to the skin layer 69 are less likely to be arranged along the protrusions 44. If the ratio (W)/(D) is higher than 2.0, two or more of the cells 68 tends to be located adjacent to the skin layer 69 in the protrusions 74 in the circumferential direction of the polyurethane sponge structure 66. In this case, as is apparent from FIG. 9(b), the cells 68 located adjacent to the skin layer 69 in the protrusions 74 are not sufficiently regularly arranged, and the size of each cell 68 is not made sufficiently uniform or constant.

The shape of the recesses 72 in the transverse cross section of the sponge structure 66 is not specifically limited. The recesses 72 may be disposed on the sponge structure 66 with various kinds of shapes, such as a V-shape, a rectangular shape and an arcuate shape. The recesses 72 are disposed on the outer circumferential surface of the sponge structure 66 so as to extend linearly in the axial direction of the toner supply roll 62 (parallel to the axis of the toner supply roll), in the illustrated embodiment. The recesses 72 may extend helically about the axis of the sponge structure 66, so that the protrusions 74 interposed between the adjacent recesses 72 extend helically about in the axis of the sponge structure. In this case, the cells 68 located adjacent to the skin layer 69 in the protrusions 74 are also regularly arranged.

Those of the cells 68 which are located adjacent to the skin layer 69 at the recesses 72 are less likely to be regularly arranged in comparison with the corresponding cells at the protrusions 74, which are interposed between the protrusions 74. Accordingly, the width of the recesses 72 in the circumferential direction of the polyurethane sponge structure 66 is preferably smaller than the width (W) of the protrusions 74, more preferably, is as small as possible. Generally, the width of the recesses 72 is about 50–300 $\mu$m.

The size (D) of the cells 68 such as the average diameter of the cells 68 which are formed in the soft polyurethane sponge structure 66 constructed according to the second embodiment of the present invention, is larger than the diameter of the openings 70. Preferably, the diameter of the cells 68 is 100–500 $\mu$m, as in the first embodiment of the present invention. The soft polyurethane sponge structure 66 may be an independent (closed) -cell or cellular type structure wherein the cells 38 do not communicate with each other, as described above, or an open-cell or non-cellular type structure wherein the cells 38 communicate with each other. Preferably, the polyurethane sponge structure 66 is of the independent or closed cell type.

According to the second embodiment of the present invention, the polyurethane sponge structure 66 is required to have a hardness of 350 g or lower, and the openings 70 through which the respective cells 68 formed adjacent to the skin layer 66 are open in the skin layer 66 are dimensioned such that the diameter of the openings 70 is held within a range of 100–800 μm, and a total area of the openings 70 is at least 20% of a total area of the outer circumferential surface of the sponge structure 66.

If the hardness of the soft polyurethane sponge structure 66 of the toner supply roll 62 exceeds the upper limit of 350 g, the function of the roll 62 to supply the toner 24 to the image developing roll 28 is deteriorated, resulting in deterioration of quality of the reproduced image. This deterioration can be confirmed by a test operation on the laser printer using the toner supply roll 62 under a low-temperature and low-humidity condition, namely at 15° C. and 10% humidity. The hardness of the toner supply roll 62 as described above is measured as shown in FIGS. 6(*a*) and 6(*b*) in the same manner as in the first embodiment of the present invention.

If the diameter of the openings 70 of the cells 68 located adjacent to the skin layer 69 is smaller than the lower limit of 100 μm, the powdered toner once admitted into the cells 68 through the openings 70 tends to be hardly discharged from the cells 68, resulting in local hardening of the polyurethane sponge structure 66. Thus, the quality of the reproduced image is undesirably deteriorated. If the diameter of the opening 70 is larger than the upper limit of 800 μm, an amount of the toner supplied from the toner supply roll 62 to the developing roll 28 is unfavorably reduced, also resulting in the image quality deterioration due to reduction of the toner concentration and failure of printing at local portions of the reproduced image. As described above, the diameter of the openings 70 of the cells 68 located adjacent to the skin layer 69 is required to be held within a range of 100–800 μm, preferably, about 200–700 μm.

Further, the soft polyurethane sponge structure 66 of the toner supply roll 62 according to the second embodiment of the present invention is formed such that the total area of the openings 70 is at least 20% of the total surface area of the skin layer 69. This arrangement of the openings 70 is also effective to permit uniform flows of the powdered toner into and out of the open cells of the polyurethane sponge structure 66, thereby preventing local hardening of the polyurethane sponge structure 66. If the percent of the total area of the openings 70 to the total surface area of the skin layer 66 is lower than 20%, the toner supply capacity of the toner supply roll 62 is insufficient, and the polyurethane sponge structure 66 tends to be clogged with the toner. The portion of the polyurethane sponge structure 66 clogged with the powdered toner suffers from excessively high hardness, resulting in deterioration of the quality of an image reproduced by the laser printer. The upper limit of the area of the skin layer 66 is preferably 80%, and more preferably 70%.

The soft polyurethane sponge structure 66 constructed according to the second embodiment of the present invention may be easily produced according to various methods known in the art. For effectively producing the toner supply roll 62 of the second embodiment of the present invention, the following second method of production may be employed. According to the second method of producing the toner supply roll 62, the soft polyurethane sponge structure 66 is formed by foaming of a polyurethane material, such that the openings 70 are formed through the skin layer 69, so that the cells 68 adjacent to the skin layer 69 are open to the atmosphere, and such that the plurality of recesses 72 are formed in the outer circumferential surface of the polyurethane sponge structure 66 so as to extend linearly or helically in the axial direction of the sponge structure 66, and are arranged in the circumferential direction of the sponge structure 66 with a suitable pitch, so that the sponge structure 66 are provided with the recesses 72 and protrusions 74 interposed between the adjacent recesses 72.

According to the second method, wherein a desired toner supply roll is produced by foam molding of a polyurethane material in a mold cavity of a mold, which mold cavity has a configuration corresponding to a desired shape of the sponge structure 66, the mold is prepared such that the inner surface of the mold cavity which defines the outer circumferential surface of the polyurethane sponge structure 66, is provided with projections corresponding to the recesses 72, which gives the recesses and the protrusions on the outer circumferential surface of the sponge structure 66. The inner surface of the mold cavity is subjected to a roughing process as well known in the art, such as shot blasting, such that the inner surface of the mold has the surface roughness Rz of 5–20 μm. Then, a coating layer of a suitable mold releasing agent, preferably of silicone resin type or fluororesin type aforementioned is formed on the inner surface of the mold cavity. Then, the foam-molding of the polyurethane material is executed in the mold as follows. Namely, the metal shaft 64 is disposed in the mold cavity, and then the polyurethane material is introduced into the mold cavity. The polyurethane material is foamed in the mold, so that the soft polyurethane sponge structure 66 is formed on the outer circumferential surface of the metal shaft 64 such that the skin layer 69 is formed so as to provide the outer circumferential surface of the polyurethane sponge structure 66, while the openings 70 are formed therethrough at respective portions of the skin layer 69, through which the cells 68 located adjacent to the skin layer 69 are open to the atmosphere, and such that the soft polyurethane sponge structure 66 is provided with the recesses 72 each extending linearly or helically in the axial direction of the toner supply roll 62, which recesses 72 are formed by the projections which protrude radially inwardly from the inner surface of the mold cavity.

When the polyurethane material in a liquid state is foamed in the mold constructed as described above, the coating layer of the mold releasing agent is formed on the inner circumferential surface of the mold cavity which defines the configuration of the outer circumferential surface of the polyurethane sponge structure 66. This coating layer exhibits water repellency and surface tension with respect to the polyurethane material. Further, the inner surface of the mold is suitably adjusted to a desired roughness (Rz). As a result, the polyurethane material is absent at those portions of the skin layer 69 which are adjacent to the cells 68 formed in the polyurethane sponge structure 66, i.e., at the portions of the skin layer 69 which are aligned with the center portions of the cells 68 adjacent to the skin layer 69 and which would otherwise be thinned. Thus, the openings 70 are formed through the skin layer 69 of the polyurethane sponge structure 66, so that the cells 68 are open in the surface of the skin layer 69. Moreover, the inner surface of the mold, which defines the outer circumferential surface of the polyurethane sponge structure 66, is provided with the projections each of which extends in the axial direction of the mold, so that the obtained toner supply roll 62 is provided with the recesses 72 corresponding to the projections, which are formed on the outer circumferential surface so as to extend in the axial direction of the toner supply roll 62.

In the second method of producing the toner supply roll 62, the inner surface of the mold or the mold cavity which defines the outer circumferential surface of the polyurethane sponge structure 66, is provided with the plurality of projections corresponding to the plurality of recesses 72, which projections extend linearly or helically in the axial direction of the mold cavity. The inner surface of the mold is subjected to a roughing process as well known in the art, such as shot blasting, such that the inner surface of the mold has the surface roughness (Rz) of 5–20 μm. If the surface roughness Rz of the inner surface of the mold is smaller than the lower limit of 5 μm, the openings 70 formed in the skin layer 69 of the polyurethane sponge structure 66 do not have a sufficiently large size. On the other hand, if the surface roughness (Rz) of the inner surface of the mold exceeds the upper limit of 20 μm, the obtained toner supply roll 62 cannot be easily removed from the mold, without breakage or tearing of the skin layer 66 and breakage or damage of the sponge structure 66.

For forming the projections corresponding to the recesses 72 in the inner surface of the mold cavity, various methods known in the art may be employed. To obtain the desired inner surface of the mold cavity, the mold may be processed by etching, electric discharge machining (wire cutting) or broaching, for example. The mold may also be subjected to an electro forming or casting so that the desired shape is effectively transferred to the inner surface of the mold.

The above-mentioned second method further comprises the step of forming the coating layer of the mold releasing agent on the inner surface of the mold which has been processed to have the specific configuration (corrugated configuration) which corresponds to the outer circumferential surface of the desired toner supply roll 62 and to have a roughness (Rz) of 5–20 μm. The coating layer may consist of any releasing agent, especially of silicone resin type or fluororesin type, which is well known in the art, such as a releasing agent including modified silicone resin, fluororesin or modified fluororesin, as a major component. Generally, the coating layer has a wall-thickness of about 1–10 μm. If the thickness of the coating layer is smaller than the lower limit of 1 μm, the coating layer cannot function as desired. If the thickness of the coating layer is larger than the upper limit of 10 μm, the surface condition of the polyurethane sponge structure 66 foamed in the mold is deteriorated. The releasing agent is applied to the inner surface of the mold and is then preferably cured by heat, so that the strength of the coating layer is effectively increased.

In the second method of the present invention, a pipe type mold as shown in FIGS. 7(*a*) and 7(*b*) is preferably used. However, the mold used in this second embodiment employs a pipe 76 as shown in the fragmentary enlarged view of FIG. 10. In the inner surface of this pipe 76, there are formed the projections 80 so as to extend linearly or helically in the axial direction of the pipe 76. The projections 80 correspond to the recesses 72 formed in the outer circumferential surface of the polyurethane sponge structure 66. The inner surface of the pipe 76 is processed to have the predetermined roughness (Rz). A coating layer 82 which consists of the releasing agent of silicone resin type or fluororesin type is formed on the inner surface of the pipe 76 with a predetermined thickness.

In the second method of producing the toner supply roll 62 according to the second embodiment of the present invention, the soft polyurethane sponge structure 66 is formed by foam-molding of the polyurethane material in the mold cavity 78 of the mold. The polyurethane material is introduced into the mold cavity 78, in a liquid state, as in the conventional method, and may be selected preferably from the known groups of reactive materials as described above with respect to the first embodiment.

The size (D) of each of the cells of the polyurethane sponge structure 66 according to the second embodiment of the present invention may be regulated by various methods as well known in the art, for example, by suitable selecting an amount of the liquid polyurethane material injected in to the mold, or by suitably selecting an adding amount of the foaming agent or the bubble-controlling agent. More specifically, water may be added to the polyurethane material as the foaming agent. If the adding amount of water is excessively small, the cells formed in the polyurethane sponge structure tend to be small. For forming the cells each having a desired size, water used as the foaming agent is added to the polyurethane material preferably in a proportion of 0.1–5 phr. The bubble-controlling agent is added preferably in a proportion of 0.1–3 phr. The amount of the liquid polyurethane material which is injected into the mold is generally 0.05–0.5 g/cm$^3$.

The liquid polyurethane material is injected into the mold cavity 86 of the mold and then the material is foamed. The material thus foamed in the mold cavity 78 gives the soft polyurethane sponge structure 66 formed on the metal shaft 32 such that the outer circumferential surface of the sponge structure 66 has the recesses 72 which are formed in the outer circumferential surface in the presence of the projections 80 formed in the inner surface of the mold. The obtained toner supply roll 62 removed from the mold is provided with the skin layer 69 having the mutually independent openings 70 which are open in the skin layer 69 and which communicate with the respective cells 68 adjacent to the skin layer 69. The openings 70 are given the suitable size owing to the properties of the inner surface of the pipe 76, as described above. The formed polyurethane sponge structure 66 may preferably be processed by crushing with compressed air described above.

EXAMPLES

There will be next described in detail preferred examples of the present invention, to further clarify the principle of the present invention. It is to be understood that the invention is not limited to the details of the following examples, but may be embodied, with various changes, modifications and improvements, which may occur to those skilled in the art, without departing from the spirit of the present invention.

Example 1

Initially, several kinds of the pipe type mold (50) as shown in FIG. 7(*a*) were prepared such that the inner surfaces of the pipes (52) made of metal are subjected to broaching so that the inner surfaces of the respective pipes (52) are provided with respective grooves (58) which have different dimensions. The grooves (58) correspond to the plurality of protrusions (35) which are provided on the outer circumferential surface of the polyurethane sponge structure (34) so as to extend linearly in the axial direction of the sponge structure (34), so that the outer circumferential surface of the polyurethane sponge structure (34) has protrusions (35) and recesses (37) interposed between adjacent ones of the protrusions. The protrusions (35) as shown in FIG. 5(a) have a rectangular shape. This shape of the protrusions (35) is referred to as "shape A". On the other hand, the protrusions (35) as shown in FIG. 5(b) have a triangular shape having a vertical angle of 80°. This shape of the protrusions (35) is referred to as "shape B". The inner surface of each of the pipe type molds (50) which have been broached was processed by shot blasting so as to have the surface roughness (Rz) of 10 µm. The inner surface of the each pipe type mold (50) was then coated with a mold releasing agent of silicone resin type which is a solution including a modified silicone resin as a major component and 3–5% of solid content, and then heated to cured the mold releasing agent. There were obtained various kinds of pipe type molds (50) the inner surfaces of which are provided with respective kinds of grooves (58) and are covered by a coating layer of the cured mold releasing agent of silicone resin type formed on the inner surface with a thickness of 5 µm.

A desired polyurethane composition was prepared by mixing the following components in the following mixing proportion: 90 parts by weight of FA-718 that is polyether polyol (OH value=28) available from SANYO CHEMICAL INDUSTRIES, LTD., JAPAN; 10 parts by weight of POP-31-28 that is polymer polyol (OH value=28) available from MITSUI TOATSU CHEMICALS INC., JAPAN; 0.5 parts by weight of KAOLIZER No. 1 that is tertiary amine catalyst available from KAO CORPORATION, JAPAN; 0.05 parts by weight of TOYOCAT HX-35 that is tertiary amine catalyst available from TOSOH CORPORATION, JAPAN; 2 parts by weight of water; 2 parts by weight of SZ-1313 that is a bubble-controlling agent of silicone type available from NIPPON UNICAR KABUSHIKI KAISHA, JAPAN; 8.8 parts by weight of SUMIDUR 44V-20 that is a crude MDI (NCO %=31) available from SUMITOMO BAYER URETHANE KABUSHIKI KAISHA, JAPAN; and 20.5 parts by weight of TDI-80 that is TDI (NCO %=48) available from MITSUI TOATSU CHEMICALS INC.

The prepared polyurethane composition was then foamed in the conventional manner in the prepared molds (50) whose pipes (52) are provided with differently dimensioned grooves (58), whereby various kinds of toner supply rolls (26) were obtained, each having the soft polyurethane sponge structure (34) formed on the metal shaft (32). The sponge structure has a plurality of protrusions (35) formed on the outer circumferential so that the outer circumferential surface of the sponge structure (34) were provided with the the protrusions (35) and the recesses (37). Each of the polyurethane sponge structure (34) of the various kinds of the toner supply rolls (26) has a hardness of 190 g, and the cells (38) have a size of 390–700 µm, while the openings (40) have a size of 330–620 µm. The total area of the openings (40) is 63.7% of the total area of the skin layer 36.

The obtained toner supply rolls (26) were measured of the height h of the protrusions (35) formed on their polyurethane sponge structures (34), the pitch (p) of the protrusions (35) in the circumferential direction of the sponge structure (34) and the width (w) of the protrusions (35) at their bottom portions in the circumferential direction of the sponge structure (34). Further, the obtained toner supply rolls (26) were incorporated in a laser printer, and printing operations were performed to reproduce an image. The image developing roll 28 was examined to check the toner supply roll 26 for the toner scratching performance, and the reproduced image was examined for occurrence of linear printing defects corresponding to the pitch of the protrusions (35). The results of those measurements and the test results are indicated in Table 1.

The toner scratching performance of the obtained toner supply rolls (26) was examined such that toner cartridges incorporating the respective toner supply rolls (26) were left for seven days under a low-temperature and low-humidity condition (15° C. and 10% humidity). Then, the toner cartridges were incorporated in a laser printer, and printing operations were performed to reproduce an image. In Table 1, "X" represents occurrence of a variation of the toner concentration on the image developing roll 28, which corresponds to the pitch of the protrusions (35), and "O" represents no variation of the toner concentration. The occurrence of the linear printed image defects were examined by printing operations performed with the toner supply rolls to reproduce an image. In Table 1, "X" represents occurrence of a linear printed image defect (e.g. linear unprinted areas) corresponding to the pitch P of the protrusions of the toner supply roll, and "O" represents no occurrence of such linear printed image defects.

As is apparent from Table 1, all of the specimen Nos. 1–7 according to the first embodiment of the present invention exhibited an excellent toner scratching performance, while eliminating unfavorable image

TABLE 1

| NO. | SHAPE OF PROTRU- SION | HEIGHT: (H) OF PROTRU- SION (µm) | PITCH: (p) OF PROTRU- SION (µm) | WIDTH: (w) OF PROTRU- SION (µm) | TONER SCRATCHING PERFORM- ANCE | PRINTED IMAGE DEFECTS |
|---|---|---|---|---|---|---|
| PRESENT INVENTION | | | | | | |
| 1 | A | 30 | 300 | 200 | O | O |
| 2 | A | 100 | 400 | 200 | O | O |
| 3 | A | 500 | 1500 | 800 | O | O |
| 4 | A | 800 | 2000 | 1000 | O | O |
| 5 | B | 50 | 300 | 150 | O | O |
| 6 | B | 300 | 600 | 500 | O | O |
| 7 | B | 500 | 1000 | 840 | O | O |
| COMPARATIVE EXAMPLES | | | | | | |
| 8 | A | 15 | 200 | 100 | X | O |
| 9 | A | 100 | 4000 | 1000 | X | X |
| 10 | A | 500 | 3000 | 1000 | X | X |

TABLE 1-continued

| NO. | SHAPE OF PROTRU-SION | HEIGHT: (H) OF PROTRU-SION (μm) | PITCH: (p) OF PROTRU-SION (μm) | WIDTH: (w) OF PROTRU-SION (μm) | TONER SCRATCHING PERFORM-ANCE | PRINTED IMAGE DEFECTS |
|---|---|---|---|---|---|---|
| 11 | B | 300 | 3500 | 500 | X | X |
| 12 | NO PROTRUSION | — | — | — | X | O | deterioration such as linear unprinted areas. On the other hand, the comparative specimens whose height h of the protrusions (35), whose pitch of the protrusions in the circumferential direction do not meet the principle of the present invention exhibited a poor toner scratching performance, leading to occurrence of the variation of the toner concentration on the developing roll 28. Further, the comparative specimen No. 12 which does not have the protrusions (35) on the outer circumferential surface of the soft polyurethane sponge structure (34) exhibited a considerably deteriorated toner scratching performance.

Example 2

Figure 10:
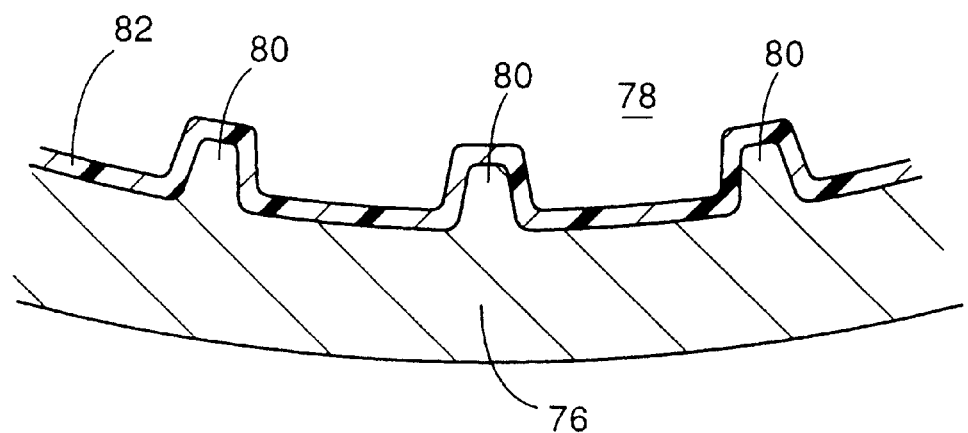
FIG. 10 is a a fragmentary enlarged view in cross section of a mold which is used in another preferred embodiment of a method of producing the toner supply roll of the present invention.

Several specimens of the toner supply roll 62 as shown in FIG. 8(a) were prepared in substantially the same manner as the toner supply roll 26 of FIG. 3(a). Initially, several kinds of the pipe type molds as shown in FIG. 10 were prepared such that the inner surfaces of the pipes (76) made of metal are subjected to broaching so that the inner surfaces of the pipes (76) are provided with projections (80) which have different dimensions. The projections (80) correspond to the plurality of recesses (72) which are provided in the outer circumferential surface of the polyurethane sponge structure (66) so as to extend linearly in the axial direction of the sponge structure (66), so that the outer circumferential surface of the polyurethane sponge structure (66) has the recesses (72) and the protrusions (74) interposed between the adjacent recesses. The inner surface of each of the pipe type molds which have been broached, was processed by shot blasting so as to have the surface roughness (Rz) of 10 μm. The inner surface of the each pipe type mold was then coated with a mold releasing agent of silicone resin type which is a solution including a modified silicone resin as a major component and 3–5% of solid content, and was then heated to cure the releasing agent. There were obtained several kinds of the pipe type molds the inner surfaces of which are provided with the differently dimensioned projections (80) and are covered by a coating layer of the cured releasing agent of silicone resin type, which is formed on the inner surface with a wall thickness of 5 μm.

A desired polyurethane composition was prepared by mixing the following contents in the following mixing proportion: 90 parts by weight of FA-718 that is polyether polyol (OH value=28) available from SANYO CHEMICAL INDUSTRIES, LTD.; 10 parts by weight of POP-31-28 that is polymer polyol (OH value=28) available from MITSUI TOATSU CHEMICALS INC.; 0.5 parts by weight of KAOLIZER No. 31 that is tertiary amine catalyst available from KAO CORPORATION; 0.05 parts by weight of TOYOCAT HX-35 that is tertiary amine catalyst available from TOSOH CORPORATION; 2 parts by weight of water; 2 parts by weight of L-5309 that is a bubble-controlling agent of silicone type available from NIPPON YUNICAR KABUSHIKI KAISHA; 8.8 parts by weight of SUMIDUR 44V-20 that is a crude MDI (NCO %=31) available from SUMITOMO BAYER URETHANE KABUSHIKI KAISHA; and 20.5 parts by weight of TDI-80 that is TDI (NCO %=48) available from MITSUI TOATSU CHEMICALS INC. For the specimen Nos. 7–10 of the toner supply rolls 62, the kinds and amounts of the bubble-controlling agents were suitably changed to change the size of the cells 68.

The prepared polyurethane compositions was then foamed in the conventional manner in the prepared molds (80) whose pipes (76) are provided with differently sized projections (80), whereby various kinds of toner supply rolls (62) were obtained, each having the soft polyurethane sponge structure (66) formed on the metal shaft (64). The sponge structure has a plurality of recesses (72) formed in the outer circumferential surface so that the outer circumferential surface of the sponge structure (66) were provided with the recesses (72) and protrusions (74). Each of the polyurethane sponge structure (66) of the various kinds of the toner supply rolls (62) has a hardness of 190 g, and the openings (70) have an average diameter of 350 μm. The total area of the openings (70) is 58% of the total area of the outer circumferential surface of the skin layer 69.

The obtained toner supply rolls (62) were measured of the depth (d) of the recesses (72) formed in their polyurethane sponge structures (66), and the width (w) of protrusions (74) interposed between adjacent ones of the recesses (72) at their bottom portions in the circumferential direction of the sponge structure (66). The toner supply rolls (62) were also examined by visual observation for uniformity of the cells (68) located adjacent to the skin layer (69) of the protrusions (74) and regularity of arrangement of those cells (68) in the protrusions (74). Further, the obtained toner supply rolls (62) were incorporated in a laser printer, and printing operations were performed to reproduce an image, The reproduced images were examined for occurrence of linear printed image defects. The results of those measurements and the test results are indicated in Table 2.

Evaluations of the uniformity of the cells (68) located adjacent to the skin layer (69) of the protrusions (74) and the regularity of the arrangement of those cells (68) were indicated in Table 2. Namely, "O" represents sufficient uniformity and regularity, while "X" represents insufficient uniformity and regularity. The occurrence of the linear printed image defects was examined by printing operation performed with each toner supply roll (62) to reproduce an image. In Table 2, "X" represents occurrence of considerable printed image defects, "Δ" represents some printed image defects, and "O" represents no printed image defects.

As is apparent from Table 2, all of the specimen Nos. 3–5 according to the present invention exhibited excellent uniformity of the cells (68) located adjacent to the skin layer (69) of the protrusions (74) and excellent regularity of the arrangement of the cells (68), while preventing occurrence of the printed image defects. On the other hand, the comparative specimen Nos. 1, 2 and 6 have an excessively small depth (d) of the recesses (72), an excessively small ratio of the width (W) of the protrusions inside of the sponge structure and consequently cause local hardening of the sponge structure due to its clogging with the toner.

The methods of producing the toner supply roll according to the present invention permits easy and reliable production of the desired toner supply roll by simply foaming the polyurethane sponge material on the metal shaft within the appropriate mold, without requiring the conventionally required grinding process while assuring improved dimensional accuracy of the toner supply roll.

TABLE 2

| CELL NO. | CELL SIZE: (D) (μm) | DEPTH: (d) OF RECESS (mm) | WIDTH: (W) OF PROTRUSION (μm) | CELLS ADJACENT TO SKIN LAYER | | PRINTED IMAGE DEFECTS |
|---|---|---|---|---|---|---|
| | | | | UNI-FORMITY | REGU-LARITY | |
| 1 | 400 | 0.03 | 200 | X | X | Δ |
| 2 | 400 | 0.10 | 150 | X | X | Δ |
| 3 | 400 | 0.15 | 300 | ○ | ○ | ○ |
| 4 | 400 | 0.15 | 500 | ○ | ○ | ○ |
| 5 | 400 | 0.15 | 700 | ○ | ○ | ○ |
| 6 | 400 | 0.15 | 1200 | X | X | X |
| 7 | 250 | 0.10 | 150 | X | X | Δ |
| 8 | 250 | 0.15 | 250 | ○ | ○ | ○ |
| 9 | 250 | 0.15 | 350 | ○ | ○ | ○ |
| 10 | 250 | 0.15 | 600 | X | X | Δ |

(74) to the cell size (D) (W/D) and an excessively large ratio of W/D. Those specimen Nos. 1, 2 and 6 suffered from deteriorated uniformity and regularity of the cells (68) and printed image defects.

It will be understood from the above description that the toner supply roll constructed according to the present invention comprises a metal shaft, and a cylindrical soft polyurethane sponge structure which is formed integrally on the outer circumferential surface of the metal shaft and which has a skin layer. In the skin layer, there are formed a multiplicity of openings communicating with cells located adjacent to the skin layer, so that the cells are open to the atmosphere through the openings. The toner supply roll of the present invention is not subjected to a grinding or polishing operation as performed in the conventional method, so that the outer surface of the toner supply roll is not fluffed with burrs or fuzz, which may cause deterioration of the quality of the reproduced image, and which may be removed during use of the roll. Further, the polyurethane sponge structure has a plurality of protrusions which are formed on the outer circumferential surface with a predetermined height so as to extend linearly or helically in the axial direction of the sponge structure, and arranged in the circumferential direction of the sponge structure at a predetermined pitch. The outer circumferential surface of the polyurethane sponge structure are provided with the protrusions and the recesses interposed between adjacent ones of the protrusions, so that the function of the toner supply roll to scratch off the residual toner powder from the image developing roll is remarkably improved, resulting in effective prevention of a variation of the toner concentration of the reproduced image.

In the toner supply roll of the present invention, the skin layer of the soft polyurethane sponge structure has the openings, which are formed at the portions of the skin layer which would otherwise be thinned in the presence of the cells. This arrangement is effective to prevent the breakage of the skin layer, which would cause the toner to enter the

What is claimed is:

1. A toner supply roll comprising:
   a metal shaft; and
   a cylindrical soft polyurethane sponge structure integrally formed on an outer circumferential surface of said metal shaft,
   said cylindrical soft polyurethane sponge structure having a hardness of not higher than 350 g, and including a skin layer,
   said cylindrical soft polyurethane sponge structure having a network of cells, and said skin layer having an outer circumferential surface and openings which are open in said outer circumferential surface and which communicate with respective ones of said cells which are located adjacent to said skin layer, said openings being substantially aligned with central portions of said respective ones of said cells in axial and circumferential directions of said cylindrical soft polyurethane sponge structure,
   each of said openings having a size within a range of 100–800 μm, and a total area of said openings being at least 20% of a total area of said outer circumferential surface of said skin layer, and
   said cylindrical soft polyurethane sponge structure having a plurality of protrusions formed on said outer circumferential surface of said skin layer so as to extend linearly or helically in said axial direction of said cylindrical soft polyurethane sponge structure, said protrusions having a height of 20–3000 μm and being arranged in a circumferential direction of said cylindrical soft polyurethane sponge structure with a pitch of 300–3000 μm, so that said outer circumferential surface of said skin layer is provided with a plurality of recesses each interposed between adjacent ones of said protrusions in said circumferential direction.

2. A toner supply roll according to claim 1, wherein said cylindrical soft polyurethane sponge structure is integrally formed on said outer circumferential surface of said metal shaft by foam molding of a polyurethane material in a mold cavity of a mold, which mold cavity has a configuration corresponding to a desired shape of said cylindrical soft polyurethane sponge structure.

3. A toner supply roll according to claim 1, wherein said hardness is expressed by a load (g) which is applied to said cylindrical soft polyurethane sponge structure in a radial direction thereof and which causes a radial deflection of 1 mm of said cylindrical soft polyurethane sponge structure in said radial direction.

4. A toner supply roll according to claim 1, wherein said total area of said openings is not higher than 80% of said total area of said outer circumferential surface of said skin layer.

5. A toner supply roll according to claim 1, wherein said total area of said openings is not higher than 70% of said total area of said outer circumferential surface of said skin layer.

6. A toner supply roll according to claim 1, wherein said size of said each opening is within a range of 200–700 μm.

7. A toner supply roll according to claim 1, wherein each of said cells has a size within a range of 100–1000 μm.

8. A toner supply roll according to claim 1, wherein each of said cells has a size within a range of 300–900 μm.

9. A toner supply roll according to claim 1, wherein each of said protrusions has a height of 50–1000 μm.

10. A toner supply roll according to claim 1, wherein said protrusions are arranged in said circumferential direction of said cylindrical soft polyurethane sponge structure with a pitch of 500–2000 μm.

11. A toner supply roll according to claim 1, wherein each of said protrusions has a width of 150–2000 μm in said circumferential direction of said cylindrical soft polyurethane sponge structure at a bottom portion thereof.

12. A toner supply roll according to claim 1, wherein each of said recesses has a width of 100–1500 μm in said circumferential direction of said cylindrical soft polyurethane sponge structure at a bottom portion thereof.

13. A toner supply roll according to claim 1 wherein said cylindrical soft polyurethane sponge structure is a closed-cell cellular type sponge structure wherein said cells do not substantially communicate with each other.

14. A toner supply roll according to claim 1, wherein each of said plurality of protrusions has a height of at least 50 μm, and a width (W) of said each protrusion in said circumferential direction of said cylindrical soft polyurethane sponge structure and a size (D) of each of said cells are determined such that a ratio (W)/(D) is in a range between 0.7 and 2.0, at least those of said cells which are located adjacent to said skin layer of said protrusions being regularly arranged in a direction of extension of said protrusions.

15. A toner supply roll according to claim 14, wherein said recesses have a width of not greater than said width (W) of said protrusions in said circumferential direction of said cylindrical soft polyurethane sponge structure.

* * * * *